United States Patent [19]

Makel et al.

[11] Patent Number: 5,586,050

[45] Date of Patent: Dec. 17, 1996

[54] REMOTELY CONTROLLABLE LNG FIELD STATION MANAGEMENT SYSTEM AND METHOD

[75] Inventors: Darby B. Makel, Sacramento; Earl D. Jansa, Shingle Springs; Daniel V. Cahill, Fair Oaks; Timothy W. Bickmore, Sacramento, all of Calif.

[73] Assignee: Aerojet General Corp., Sacramento, Calif.

[21] Appl. No.: 297,337

[22] Filed: Aug. 10, 1994

[51] Int. Cl.$^6$ .............................. F04B 15/08; G01B 21/00
[52] U.S. Cl. .......................... 364/509; 364/510; 364/465; 340/825.31; 73/40; 73/40.5 R; 417/901
[58] Field of Search .................................. 364/509, 510, 364/478, 464, 465; 340/626, 605, 825.31; 73/40, 40.5 R; 417/901

[56] References Cited

U.S. PATENT DOCUMENTS

| | | | |
|---|---|---|---|
| 3,764,063 | 10/1973 | Dale et al. | 220/437 |
| 4,066,095 | 1/1978 | Massa | 137/486 |
| 4,088,987 | 5/1978 | Resler et al. | 340/242 |
| 4,404,843 | 9/1983 | Johnson et al. | 73/49.2 |
| 4,658,371 | 4/1987 | Walsh et al. | 364/550 |
| 4,736,193 | 4/1988 | Slocum et al. | 340/523 |
| 4,740,777 | 4/1988 | Slocum et al. | 340/522 |
| 4,752,698 | 7/1986 | Furuyama et al. | 307/116 |
| 4,835,522 | 5/1989 | Andrejasich et al. | 340/521 |
| 5,394,336 | 2/1995 | Warn et al. | 364/479 |
| 5,411,374 | 5/1995 | Gram | 417/53 |

*Primary Examiner*—James P. Trammell
*Assistant Examiner*—Kamini Shah
*Attorney, Agent, or Firm*—Oblon, Spivak, McClelland, Maier & Neustadt P.C.

[57] ABSTRACT

A remotely controllable apparatus, system and method for monitoring, inventory, controlling and reporting on the filling, refilling and dispensing of Liquified Natural Gas (LNG) at portable temporary or semi-permanent field-located storage and dispensing stations, including a portable storage tank, and an associated portable pump and control skid, which skid includes: an on-site microprocessor control system having: security features; pump, fill and dispense connections; an LNG leak detection system; a communications link (typically an RF cellular phone system) to a host computer; a dispensing and refilling sales authorization and initiation system (typically a card reader of the credit, access or proximity card types); and a remotely located host computer having a full suite of features including: inventory, monitoring, security and access control; operational control; financial and transaction record keeping and report generation; and emergency warning and shut-down. The field control unit control functions are performed by the on-site microprocessor which receives input from a plurality of natural gas leak detection sensors, and provides complete on site security screening, data acquisition, transaction recording and control capability, including warning via lights, horn or recorded or synthesized voice, and shut-off or shut-down. The field control unit monitors and controls prescribed user vehicle and storage tank filling procedures, and provides communications to a remote central monitoring site having a host computer master controller, via cellular phone.

24 Claims, 14 Drawing Sheets

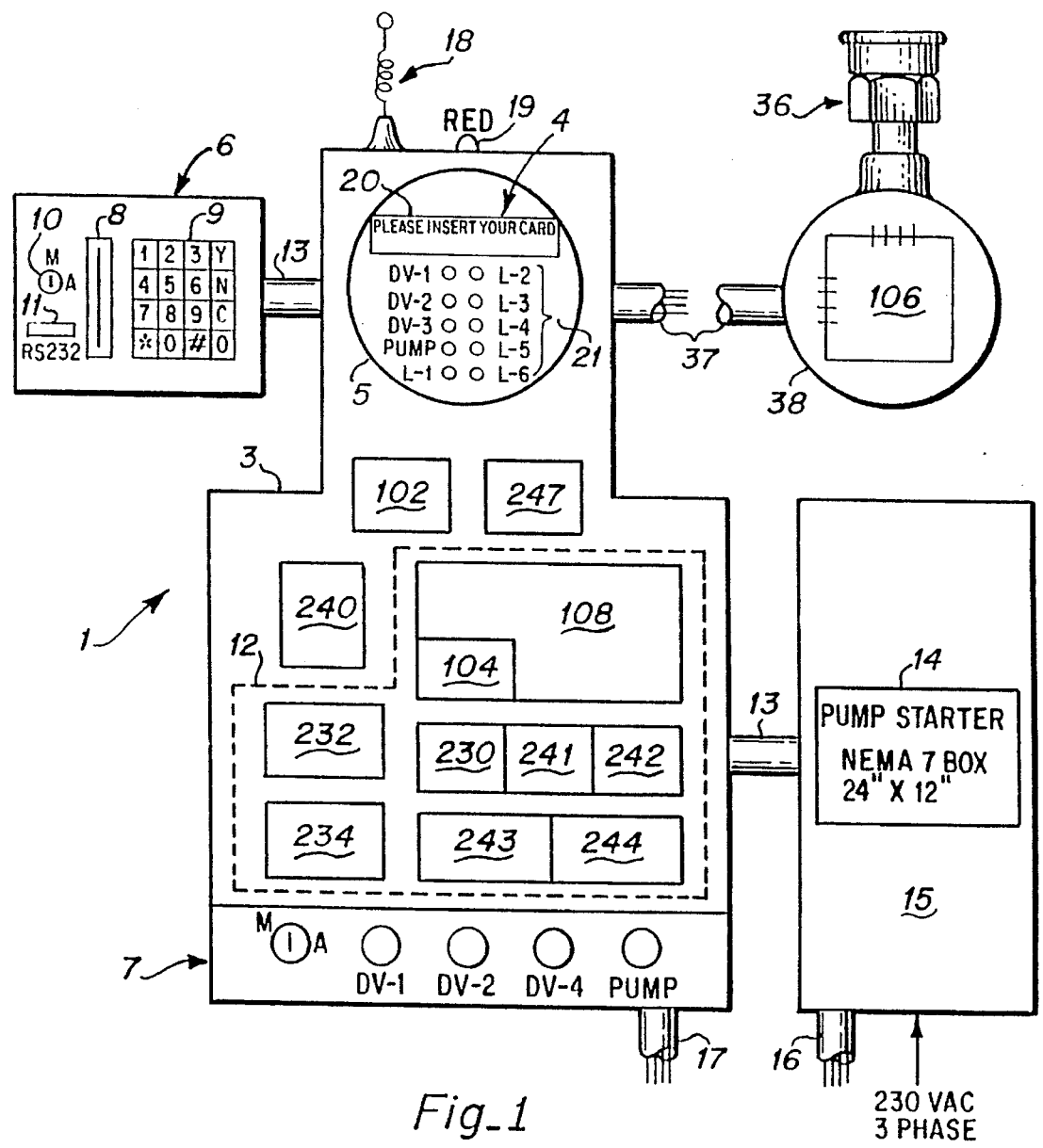
Fig_1

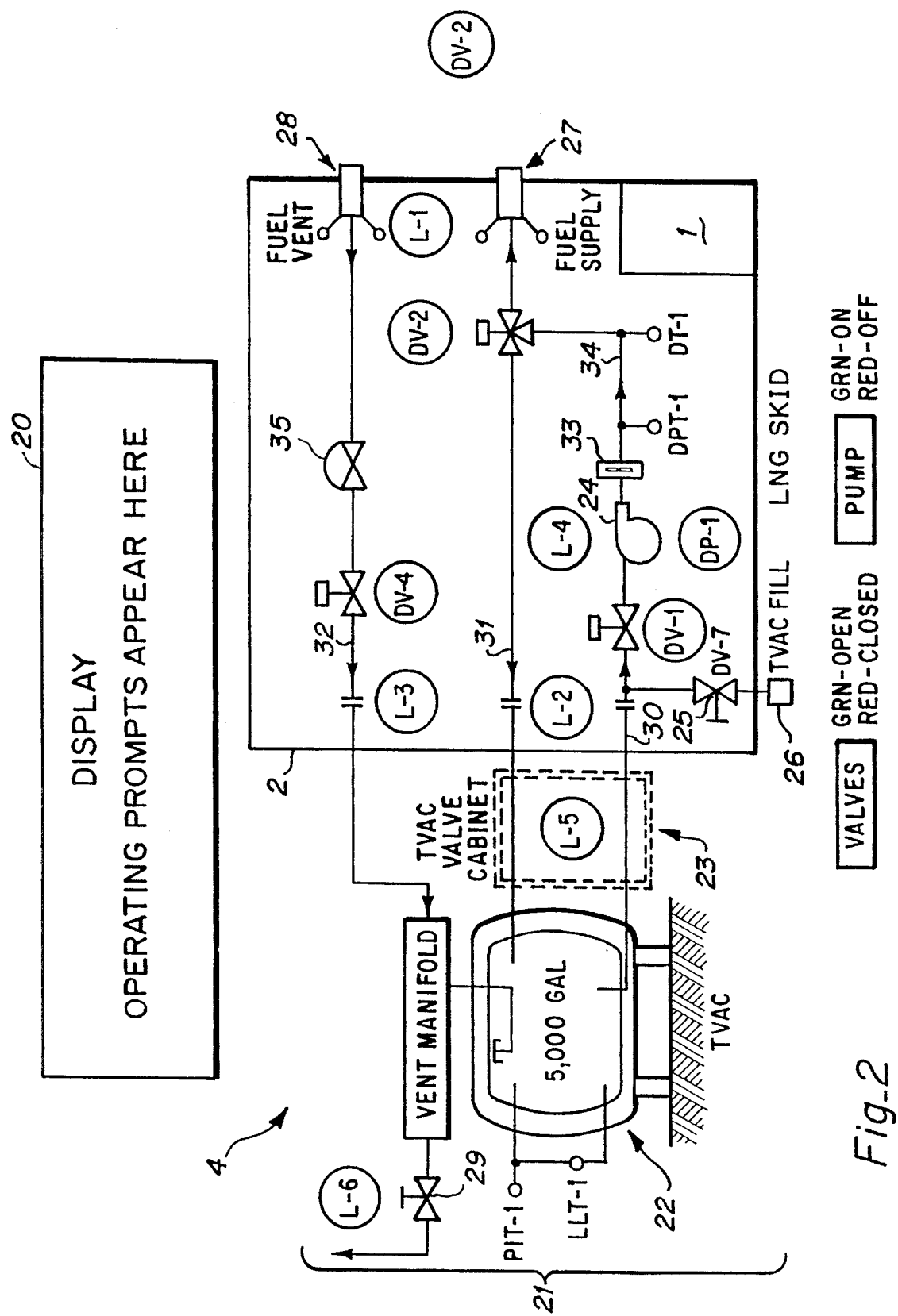
Fig._2

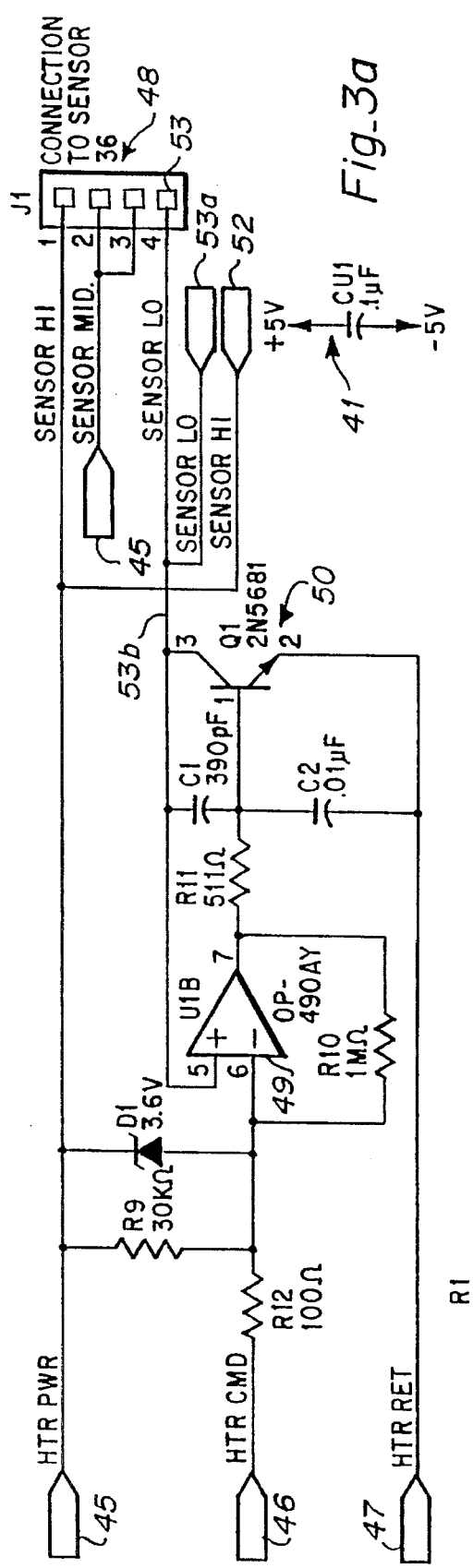
Fig_3a
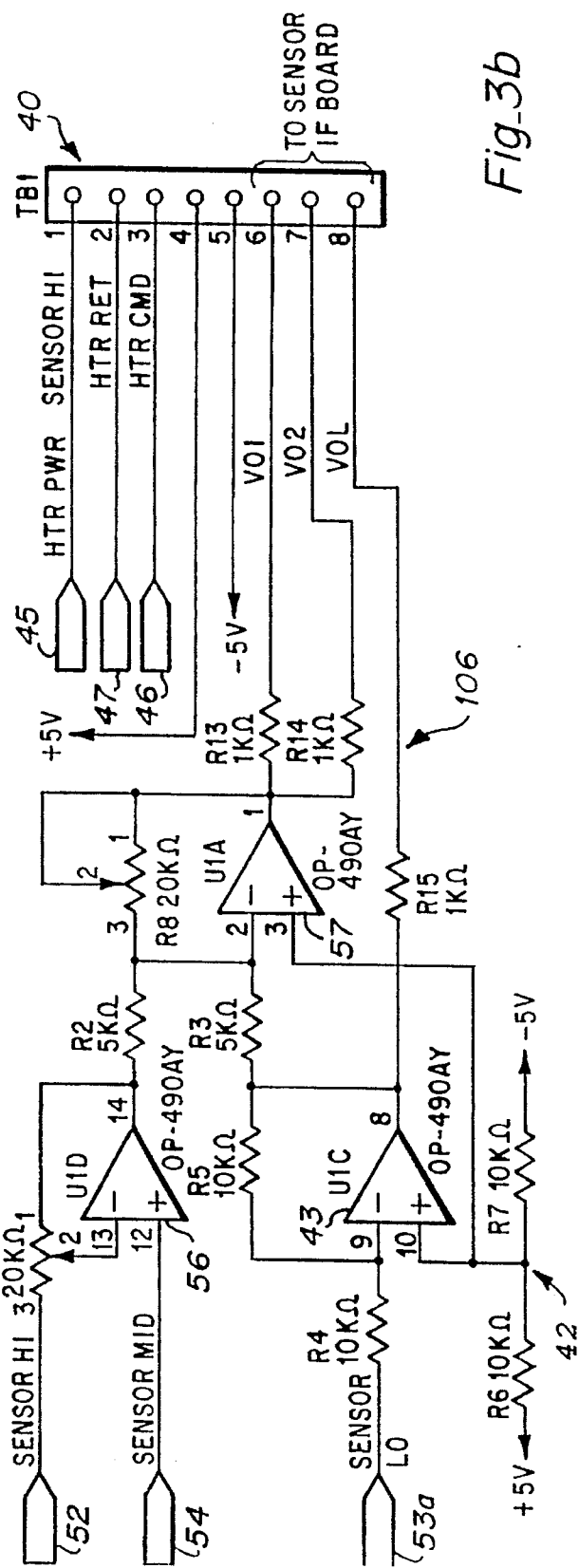
Fig_3b

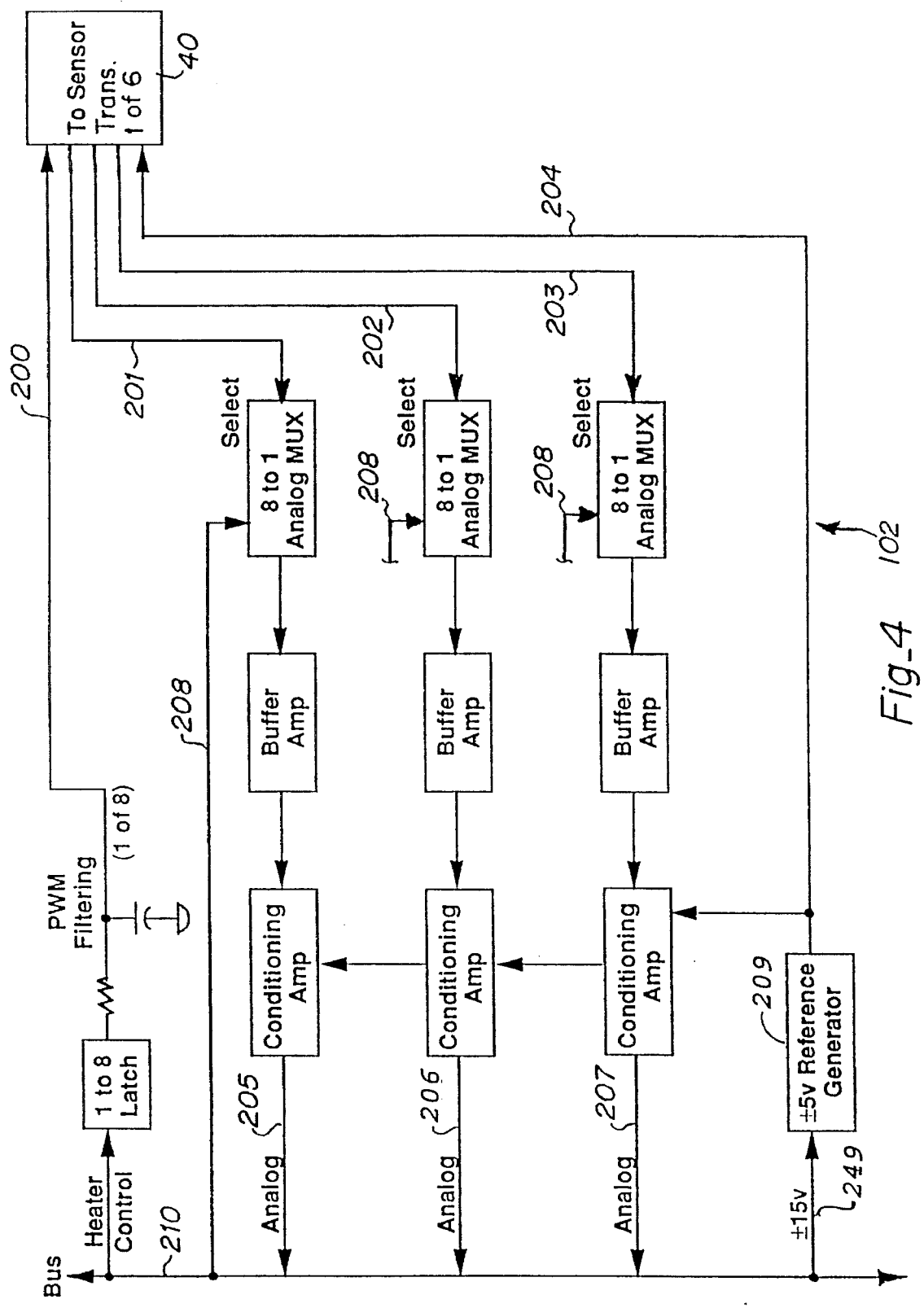
Fig_4

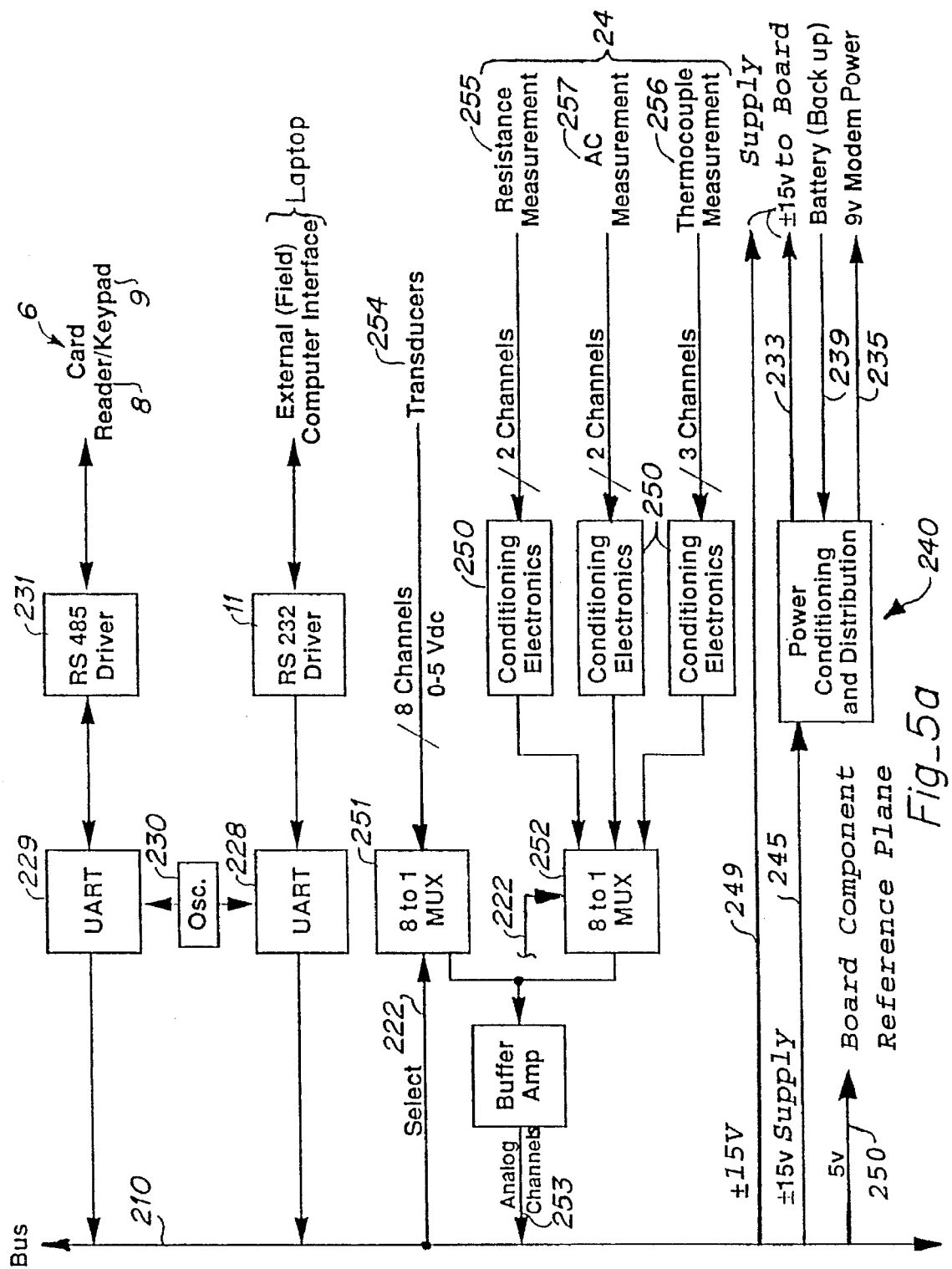

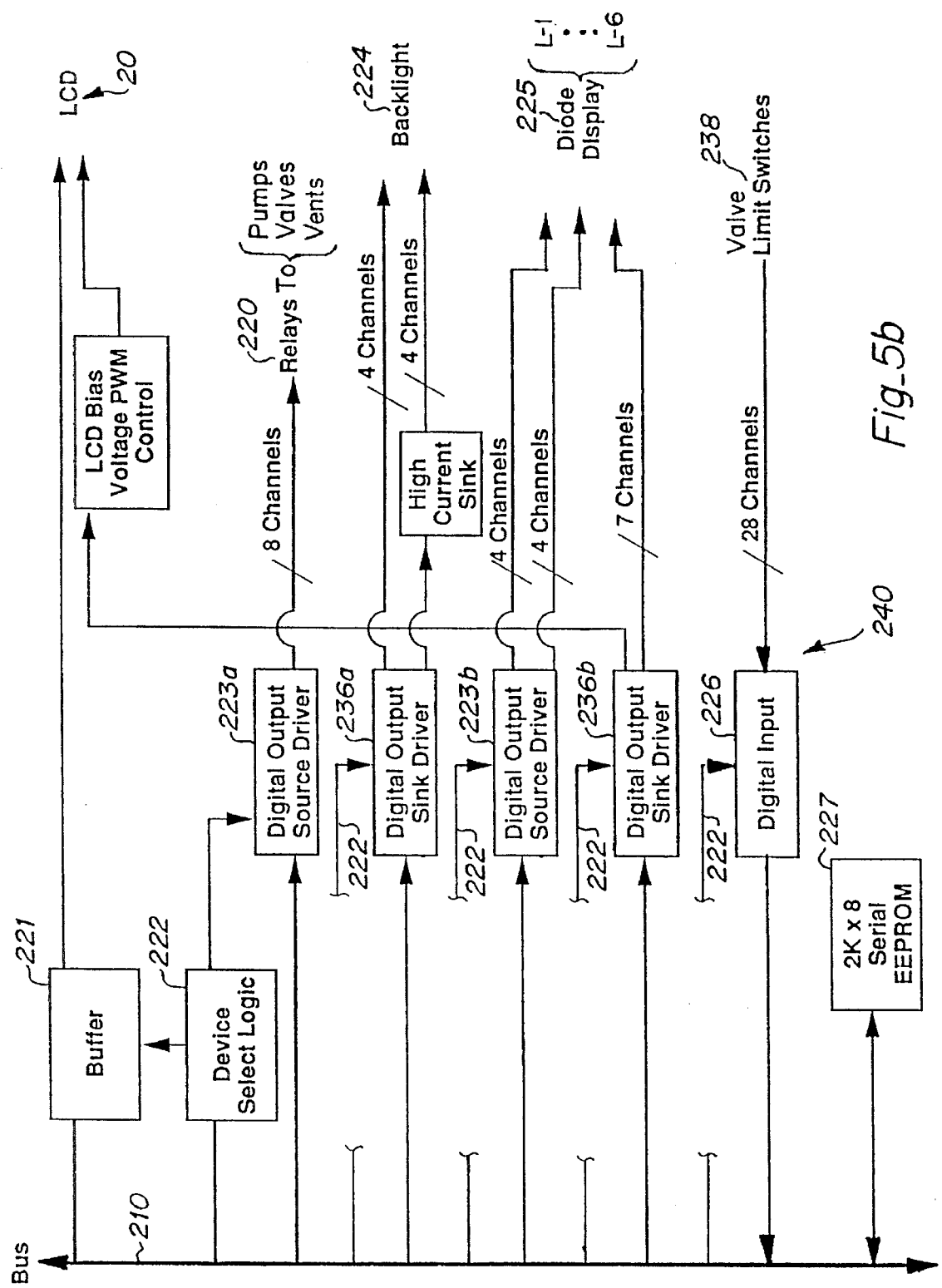
Fig_5b

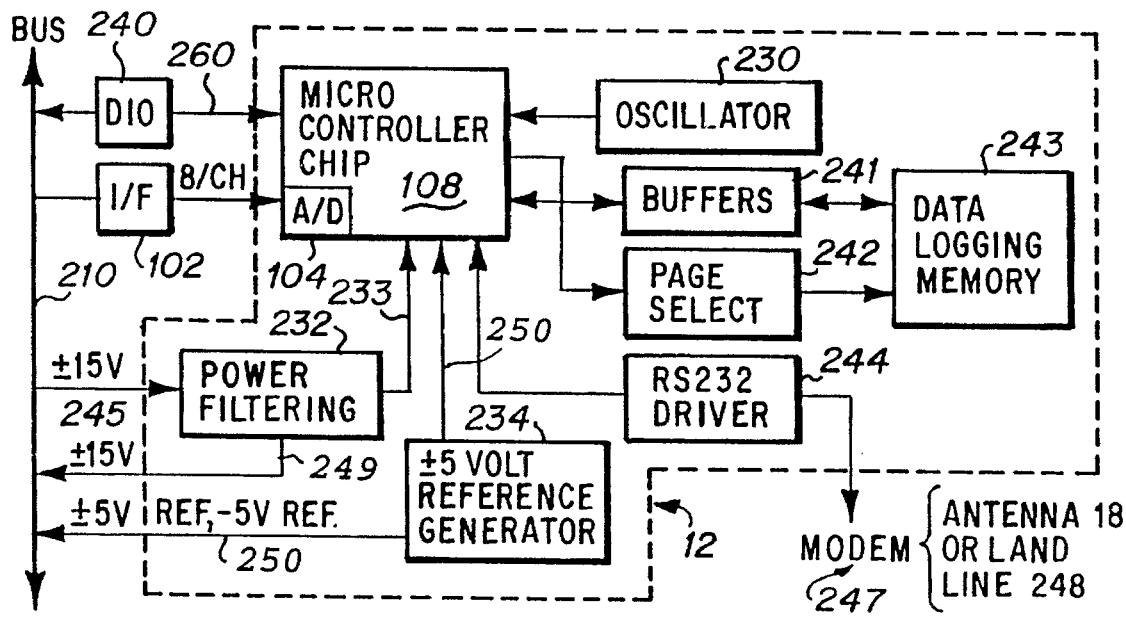
Fig_6
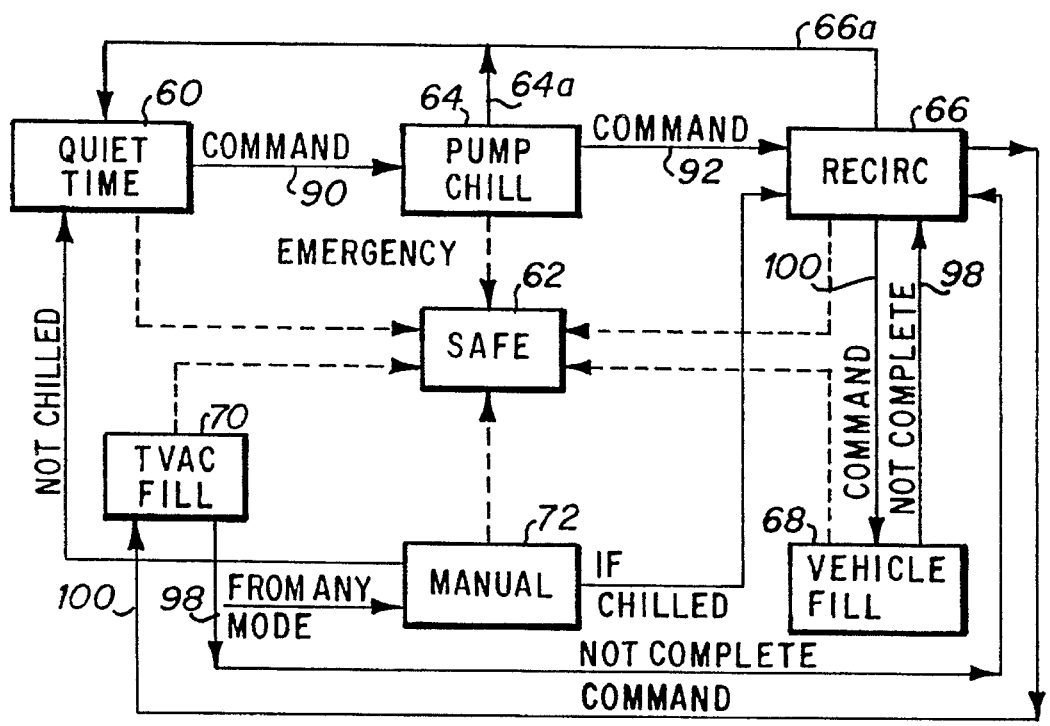
Fig_7

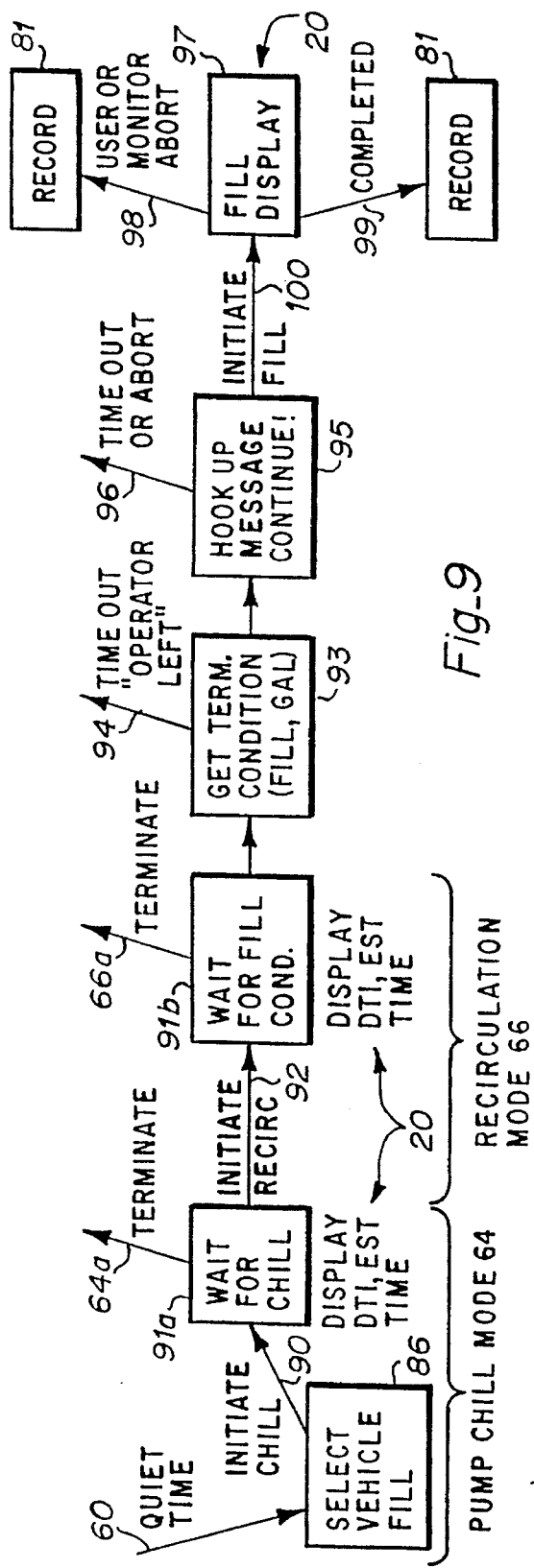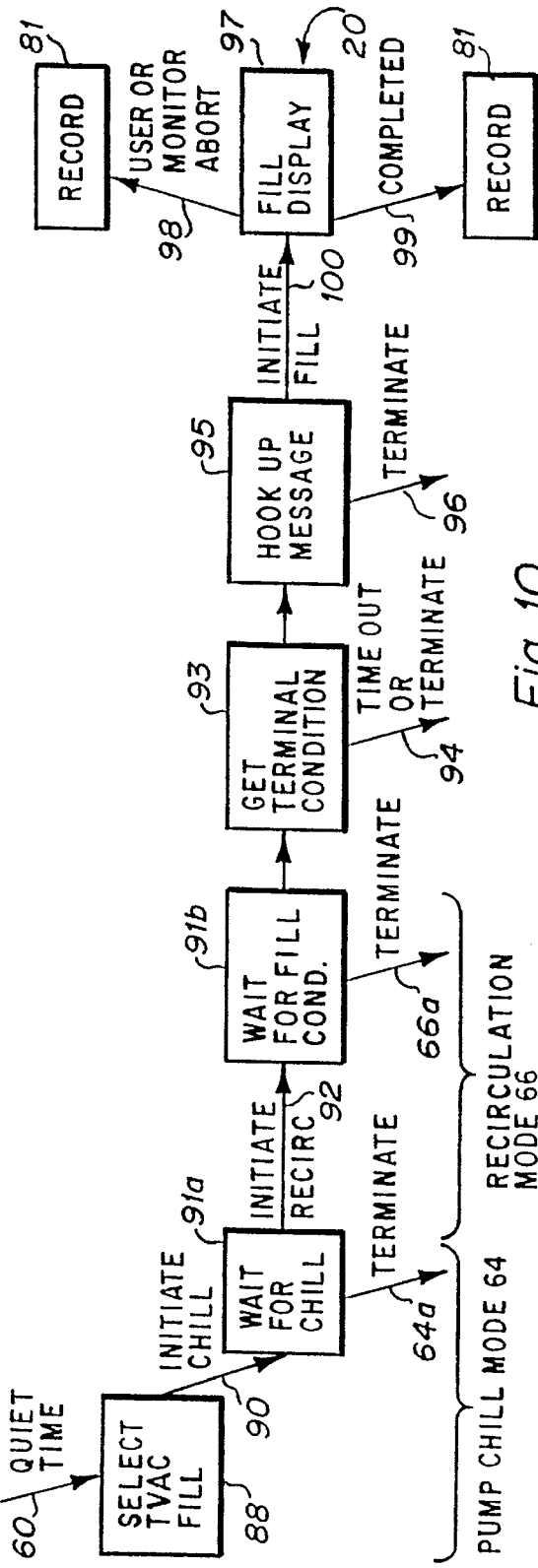

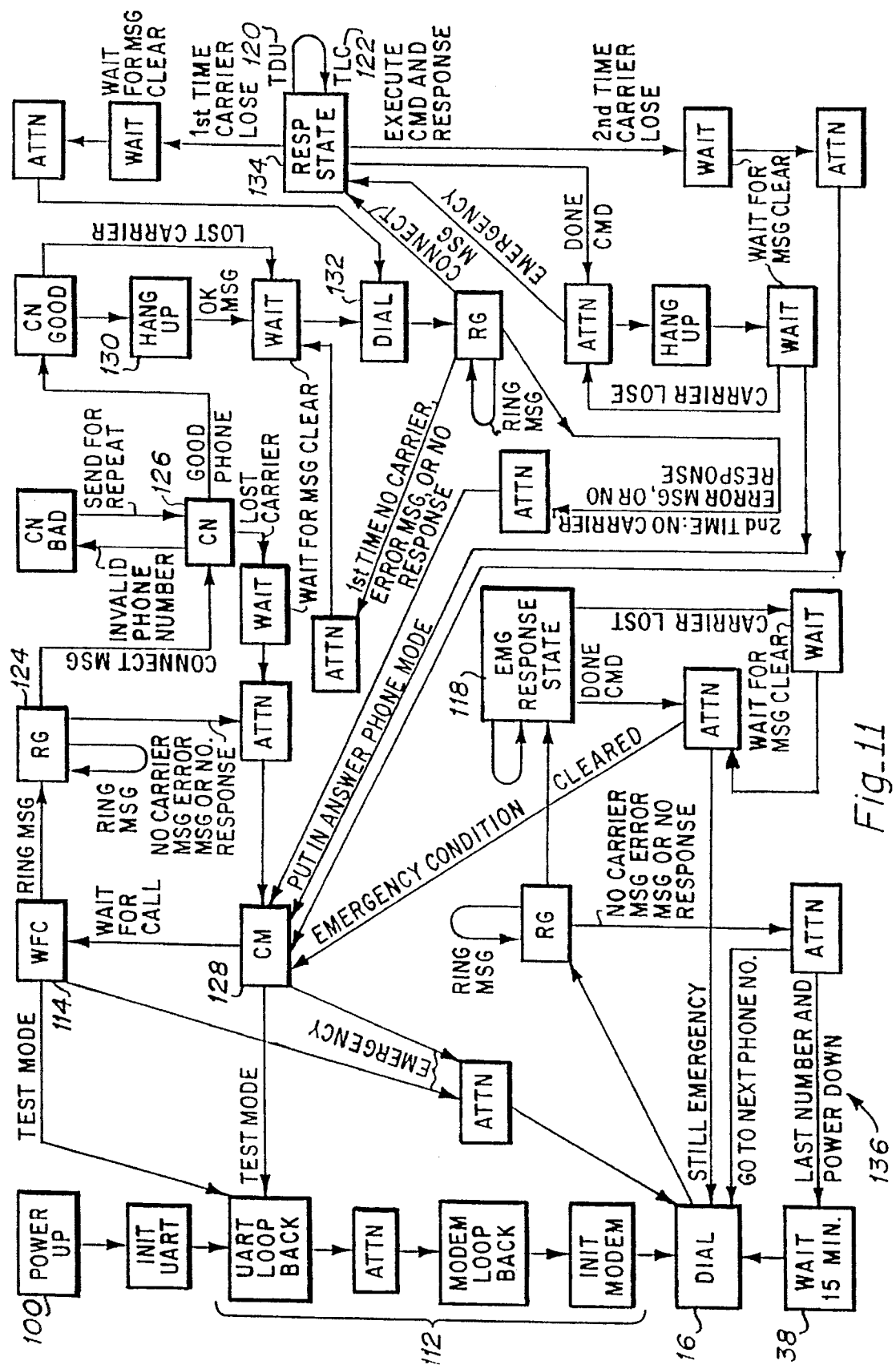
Fig_11

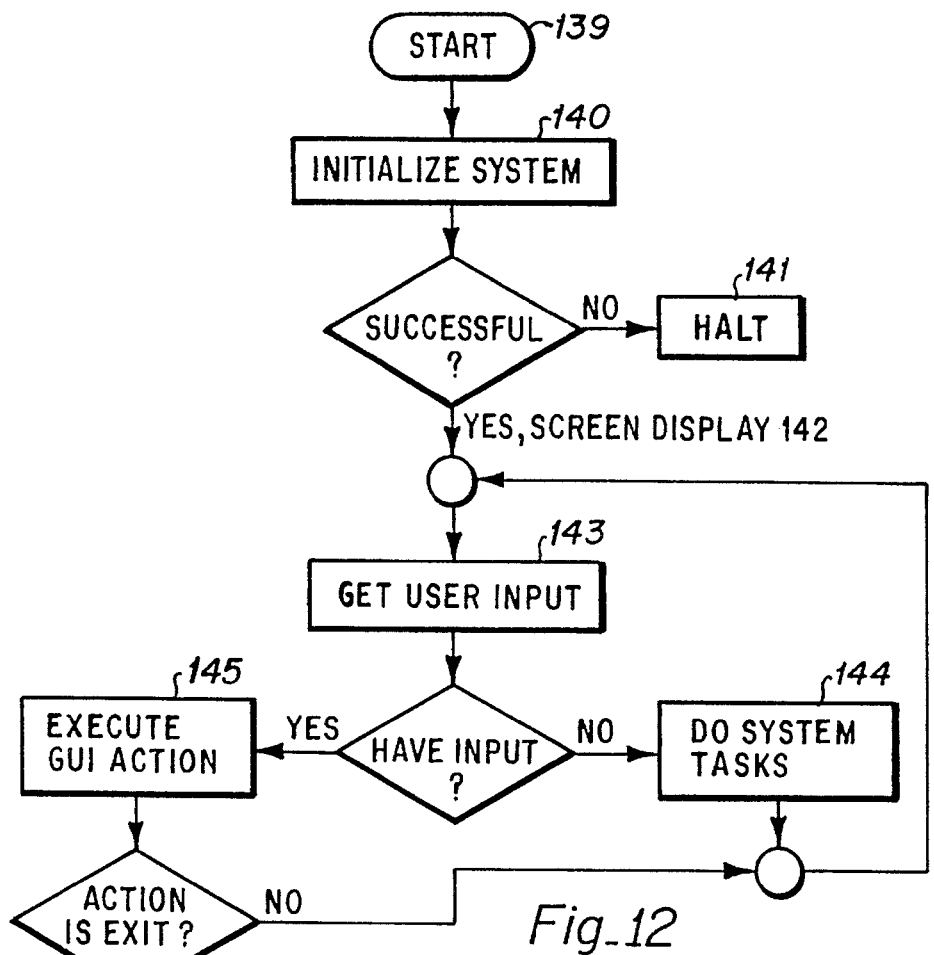
Fig_12
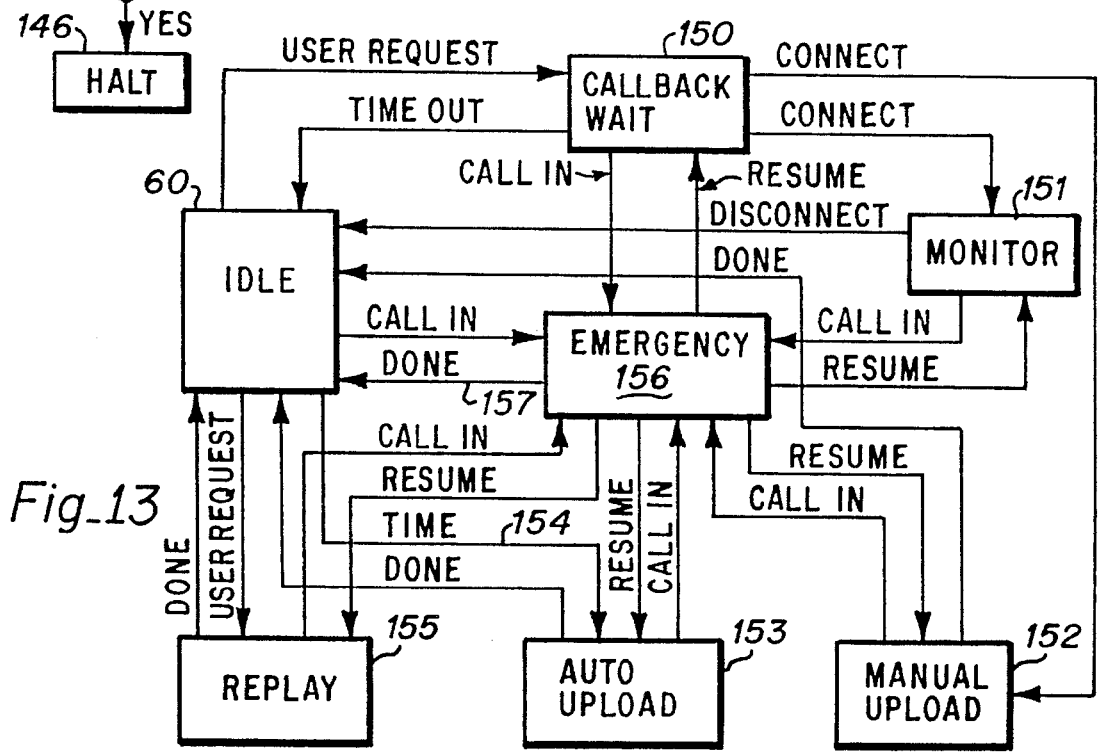
Fig_13

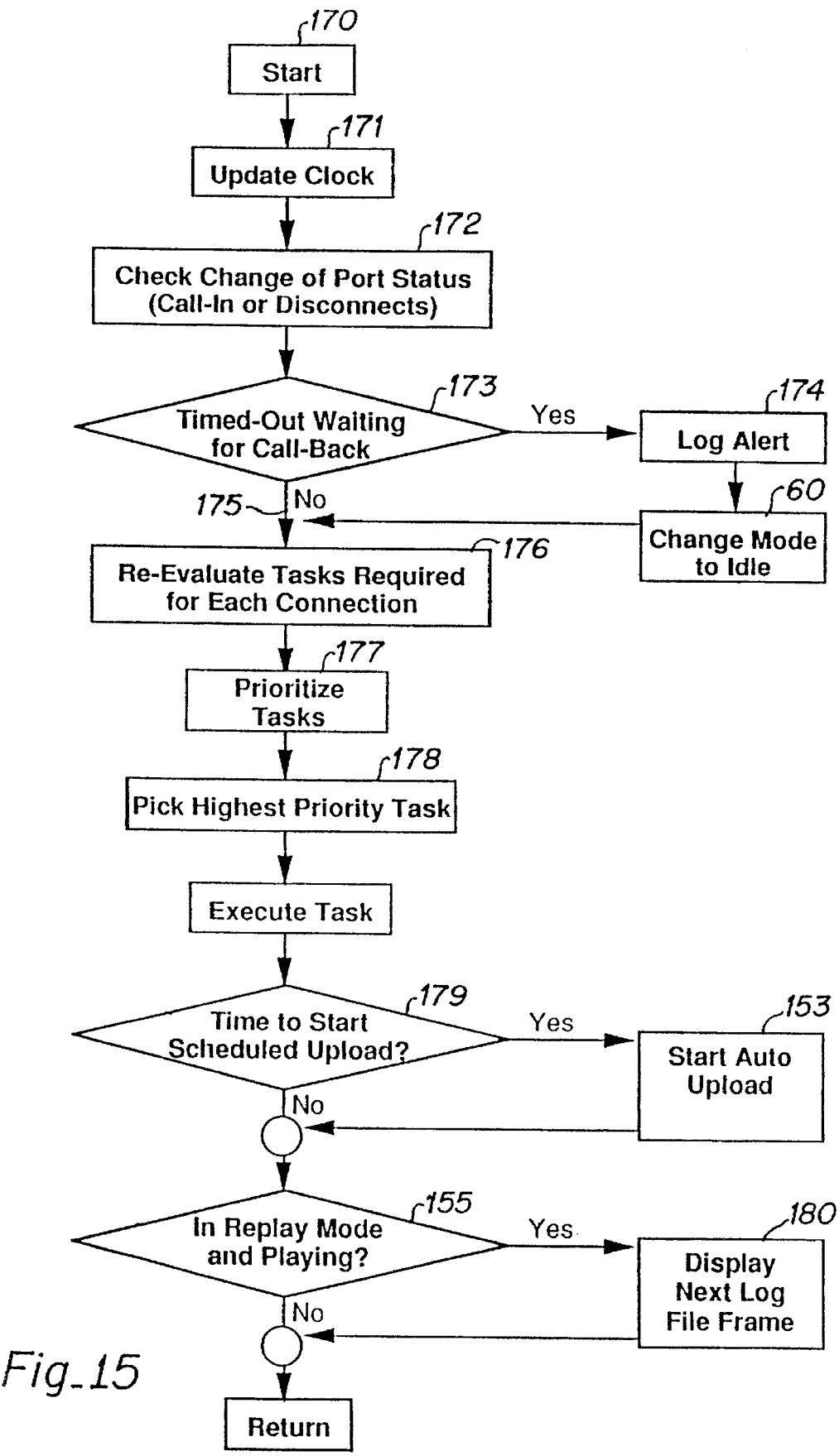
Fig_15

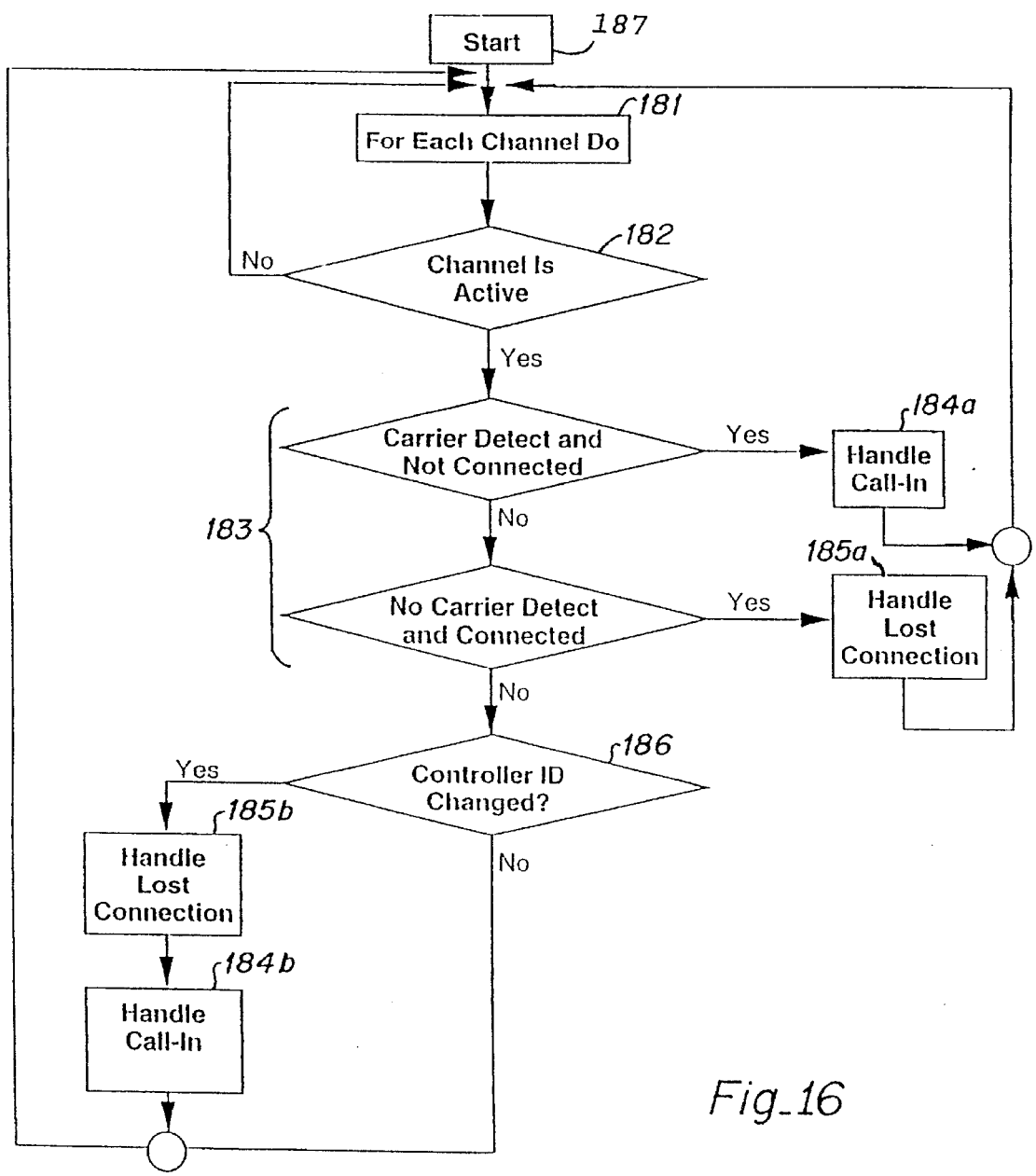
Fig_16

REMOTELY CONTROLLABLE LNG FIELD STATION MANAGEMENT SYSTEM AND METHOD

FIELD

This application relates to an LNG field station management system, and more particularly to a remotely controllable apparatus, system and method for monitoring, inventory, controlling and reporting on the filling, refilling and dispensing of Liquified Natural Gas (LNG) at portable temporary or semi-permanent field-located storage and dispensing stations, including a portable storage tank, and an associated portable pump and control skid, which skid includes: an on-site microprocessor control system having security features; pump, fill and dispense connections; an LNG leak detection system; a communications link (typically an RF cellular phone system); a dispensing and refilling sales authorization and initiation system (typically a card reader of the credit, access or proximity card types); and a remotely located host computer having a full suite of features, including inventory, monitoring, security and access control, operational control, financial and transaction record keeping and report generation, and emergency warning and shut-down.

BACKGROUND

As emphasis shifts to greater use of LNG as an environmentally "green" fuel, the need for free-standing dispensing stations grows. Currently LNG is primarily used for industrial applications, or long term storage of natural gas in liquified form as a space conservation measure. While popular, LNG or propane tank fueling for home, cabin or camp use is still, volumetrically, less than half of all usage.

A major foreseeable growth area is in vehicular use, particularly in mass transit and fleet truck and/or utility van usage. Personal automotive use is still some way off, but promises to become significant as auto emissions reduction target dates approach.

Portable LNG "stations" consisting of a storage tank module (including a valve box) and an associated pumping module or skid have recently become available. These are used at various new field sites, either temporarily until a permanent station with underground tank storage is built, or until the particular job at that site is completed. Examples include industrial or utility vehicle field stations at remote job sites, at airports or where demand requires, e.g. at an industrial plant or vehicle depot when a vehicle fleet or plant operation is converted to LNG fuel.

However, such stations today are manually operated by authorized "station" operator or driver personnel, and have, at best, rudimentary leak detection systems. They are limited in usage in that the filling of the storage tanks is not remotely monitorable at a central station, nor is the dispensing monitorable or subject to charge pre-authorization, monitoring or control. The safety status is not remotely monitorable or controllable for shut-down during emergency or unauthorized usage.

One very serious problem with attendant-less refueling stations is security. The product is expensive and valuable, such that there is a need for accurate tracking of both filing (independent of the supplier's truck in order to verify filling quantities and charges), and user pumping (for full billing to the customer). Thus security is needed for authorized access to both fill and pump to prevent cheating upon filling and theft upon customer use. In addition, the product is a fuel with attendant fire and explosion hazards such that unauthorized use could lead to safety hazards, e.g. deliberate or accidental discharge by unauthorized persons.

A number of U.S. patents have been directed to a variety of detection systems for gas or fluid flow, including: Massa U.S. Pat. No. 4,066,095; Slocum et al., U.S. Pat. No. 4,736,193; Andrejasich et al., U.S. Pat. No. 4,835,522; Furuyama U.S. Pat. No. 4,752,698; and Slocum U.S. Pat. No. 4,740,777. None of these address the special problems of portable field LNG storage/dispensing stations.

Accordingly, in order to facilitate the use and expand access to meet customer usage requirements, there is a need for specially adapted systems to remotely monitor and control operations at attendantless free-standing LNG field stations, and to permit user card-controlled access payment and dispensing 24 hrs/day while maintaining a high degree of security and the ability to remotely change security access codes in real time as safety and customer needs require.

Such a system needs to be: remotely controllable via a wireless communications link; have the ability to monitor day to day usage; inventory the remaining supply and signal refilling as demand varies; authorize, restrict and control access; provide field condition instruction and use instructions; sense dangerous operations including leak detection; keep a history of transactions and inventory; and signal and control operations, including shut-downs or shut-offs during emergency conditions.

THE INVENTION

OBJECTS

It is among the objects of the invention to provide a remotely addressable operating and control system for a portable free-standing LNG field storage and dispensing station;

It is another object to provide a control system for a portable LNG field station which features operations monitoring and control systems that are linked to one or more remote host computer(s) or microprocessor(s), preferably via RF cellular phone; or land lines;

It is another object to provide a portable LNG field station that includes an LNG leak detection system employing an array of sensors and a control'system responsive thereto;

It is another object to provide an LNG station control system which includes station inventory and condition monitors and a user card reader which permits operational access and authorization for fill or dispensing, and also records transactions for payment and/or inventory purposes, and which control system can be remotely accessed, monitored and directed via wireless communications link;

It is another object of the invention to provide computer programs for field microprocessor control of the LNG refueling station and for communications link to a remote host computer, and computer programs for host computer remote monitoring and control of the LNG station;

It is another object to provide security access and operational features for control of an LNG fueling station, be it a portable remote field station or a more permanent site, and which permits remote monitoring and rapid change of security codes for access and use of the station; and Still other objects will be evident from the Specification, Claims and Drawings of this Application.

DRAWINGS

The invention is illustrated in connection with the drawings in which:

FIG. 1 is a schematic elevation view of one embodiment of the control system enclosures and layout of this invention as mounted on the LNG skid, with some of the component features identified;

FIG. 2 is an elevation view of the display in the skid control box including the LCD user prompt panel and a schematic layout of the storage tank, valve box and control skid which is operated by the control system of this invention;

FIG. 3 is a schematic diagram of the flammable sensor transmission circuit, including a heater power circuit FIG. 3a and a sensor signal conditioning circuit FIG. 3b;

FIG. 4 is a block diagram of the interface board between the flammable gas sensor transmission circuit of FIG. 3 and the skid microcontroller circuit of FIG. 6;

FIG. 5 is a two-part block diagram of the digital I/O board which is the primary interface for all other (non-gas) sensor inputs/outputs and the microcontroller circuit of FIG. 6 and wherein FIG. 5a shows the input circuitry and FIG. 5b is the output circuitry;

FIG. 6 is a block diagram of the microcontroller circuit.

FIG. 7 is a logic block diagram of the control modes of the field microprocessor control system;

FIG. 9 is a flow sheet of vehicle fill operations as controlled by the microcontroller firmware;

FIG. 10 is a flow sheet of the TVAC fill operation as controlled by the microcontroller firmware;

FIG. 11 is a flow sheet of the microcontroller modem control operations;

FIG. 12 is a flow diagram of the top level control of the host computer;

FIG. 13 is a flow sheet of the several control mode operations of the host computer;

FIG. 15 is a flow sheet of the host computer system tasks control software;

FIG. 16 is a flow sheet of the host computer change of part status check and control operation.

SUMMARY

Figure 8:
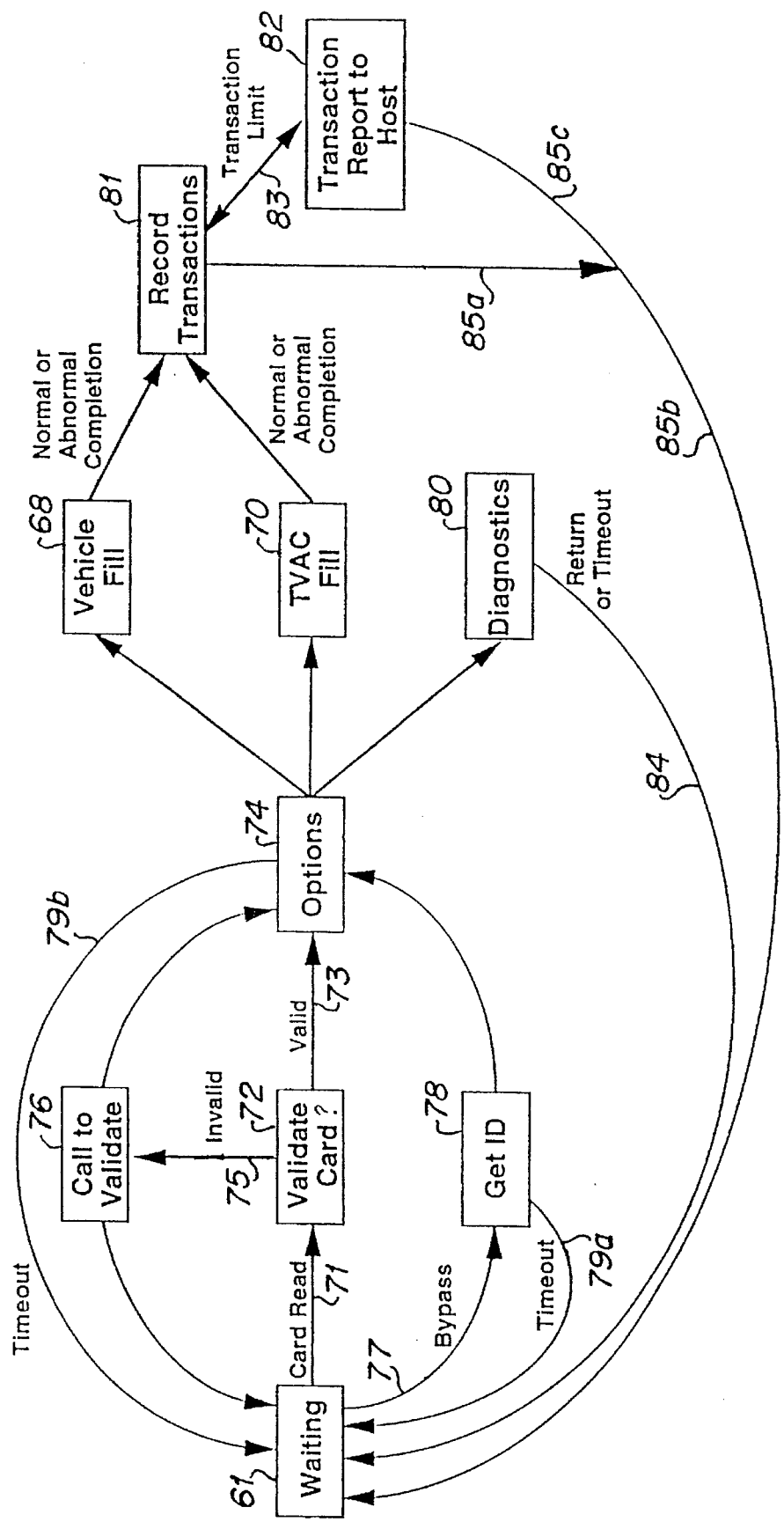
FIG. 8 is a logic diagram of the operator modes programmed into the field microcontroller firmware for microprocessor control of the operations.

The invention comprises a remotely and locally accessible control system, apparatus and method, for control of a refueling station, and more particularly to a free-standing portable LNG field fueling station. The control system includes a remote host computer having a wide range of access, operations and safety control, system status and monitoring, inventory, report generating, input, display and security features, which can poll the field station's controller via wireless or land line communications to effect monitoring and control of all phases of operation of a portable field LNG refueling station. The system of the invention also includes a remote field microprocessor-based control unit in association with the storage tank and pump/valve assembly for control of the operations of the station itself, and which field controller is linked to the remote host computer.

The field control unit includes the microprocessor control unit featuring firmware resident in microcontroller OT ROM (which is One-Time programmable ROM), or equivalent programmable device, plus system parameter data stored on 512 Kbyte 8 bit EEPROM, (Electrically Erasable PROM), with output function leads, an access and user card reader, a communications link such as an RF cellular phone, and an array of leak detection sensors. The field control unit is housed in an explosion-proof housing, typically a 1" thick aluminum box having a safety glass port for viewing condition monitoring and user instructions display(s) therein.

The field control unit is typically mounted on or associated with a skid-mounted pump and switchable valving system (valve manifold) for handling of the liquid fuel into and out of a storage tank mounted on a separate skid, typically a 5000 gallon LNG tank skid (a TVAC) having an appropriate valve box with supply, vent and recirculation input/output piping and valves.

In operation, the field control unit can be locally or remotely accessed and polled for status, control, and security code modification. The field control system provides electronic control, communications, transaction recording, security access control and leak detection. The field control unit of the invention is housed in one or more NEMA 7 class explosion-proof enclosures, typically one for the user card reader and keypad, and one for the remaining components, which include: The station controller, herein called the microprocessor or micro controller to distinguish it from the remote host computer; the liquid crystal display (LCD) for displaying user operating prompts and station condition messages; a viewport accessing a schematic of the storage tank and pump skid showing line, valving and leak detection (LD) layouts, and having red/green LED lights indicating status of the pump, valves and LD sensors; the cellular phone transceiver; and manual override controls.

The field control unit control functions are performed by the on-site microprocessor which receives input from a plurality of natural gas leak detection sensors, in the example shown, six such sensors, and provides complete security screening, data acquisition, transaction recording and control capability, including warning via lights, horn or recorded or synthesized voice, and shut-off or shut-down. The field control unit monitors and controls prescribed user vehicle and storage tank filling procedures, and provides communications to a remote central monitoring site having a host computer master controller, via cellular phone. In the event a leak is detected, the field control system microprocessor will secure the field station into a shutdown condition by closing, and/or opening appropriate valves to stop or cause recirculation flow of LNG, stop the pump, activate warning devices (light, horn, annunciators) dial the control monitoring site host and report the shut-down.

Similarly, unauthorized usage attempts, low storage supply, or other incidents can be programmed into the field micro controller to signal the remote host for appropriate action. The field control unit microprocessor can be operated in real time from the remote host by the system operating software portion of this invention, enabling the station to be reactivated within minutes after safe conditions have been restored after shutdown. Likewise security codes can be changed from the host, permitting access by authorized users after an unauthorized access attempt or unauthorized use has triggered shut-off. Note shut-down refers to unsafe (leak detected) conditions, while shut-off refers, generally, to unauthorized access, use or misuse being detected. The microprocessor can be accessed and controlled locally by a laptop computer running the system software. The on-site display of the status of the pump, valves and LD sensors is provided by an array of red/green LEDs in a viewable schematic of the field station tank and pump/controller skid.

Operation of the field system controller system microprocessor for a vehicle fill or TVAC (storage tank) fill operation is initiated by a user inserting a magnetic or proximity card into the card reader slot. The micro controller prompts the user via an LCD display to perform required procedures, and aborts the fill if the user fails to comply after three chances or 90 seconds with no or improper response. The micro controller recognizes at least two types of "cards", a "USER" card and an "OPERATOR" card. The "USER" card is intended for individuals who will be refueling vehicles at the station. The "OPERATOR" card is for station attendants and TVAC storage tank refill suppliers, e.g., tanker drivers. The "USER" card starts the control logic only for a normal vehicle fill operation. An "OPERATOR" card provides a choice of vehicle fill or TVAC fill procedures. The "USER" and "OPERATOR" cards have unique ID numbers which are matched to user name, authorized account, user limits, vehicle ID, and the like. All vehicle fill and TVAC refill operations and transactions are recorded by the micro controller, time and date stamped, and down loaded to the central monitoring station either automatically (preprogrammed) or upon host callup commands.

The system includes a set of manual override controls which are activated by a key switch and/or other authorized access, e.g. by use of the keypad to enter a security code. Activating the manual override inhibits the controller from operating valves or the pump and permits an operator to manually operate the skid. When the manual override controls are in use, the controller will continue to log data, operate the LCD display and/or LED indicators, and communicate with the remote host, and optionally may be capable of station shut-down.

The system operating software sited in the host computer permits remote field service applications. The software is configured for real-time data display and control of the field stations. The software displays plant (layout) diagrams of stations, the transaction history, and provides complete data communications, data acquisition and access/use security control. Communications security for the system is ensured through a call back protocol whereby if a call is received by the field station, it will hang up and call the central monitoring station. The micro controller can be programmed to attempt on the order of 10 or more different phone numbers in case of busy signal, or to continue to dial a prescribed sequence of phone numbers. The host system operating (HSO) software is configured to match the number of field control systems at the time of installation. The HSO software handles an unlimited number of field stations.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

SKID CONTROL SYSTEM APPARATUS

FIG. 1 is an elevation view, primarily schematic, of the enclosures of the control system 1 mounted on a skid herein called the LNG control system skid (item 2 in FIG. 2) or LNG skid for short. The components of the control system include a NEMA-7, controller housing 3, (hinged door not shown), which although shown in an inverted, generally T shape, is preferably a single rectangular enclosure, the upper portion of which includes a viewable backlit graphic display and schematic 4 (shown and described in detail below with reference to FIG. 2) which is visible through explosion proof glass port 5. The card reader unit 6 comprises a slide type, two track mag stripe scanner head 8, a keypad 9, an override key switch 10, an RS232 port 11 for on site computer hook up, in a suitable weatherproof NEMA-4 box (with liftable weather cover), and the electrical leads are connected to the micro controller 12 in the lower portion of enclosure 3 through conduit 13. While the card reader 8 is presently preferred to be a mag stripe "swipe" type scanner, it can be an RF transceiver or other type of proximity card reader.

In the lower portion of the main box 3 is an array of manual override controls 7, from left to right a key switch and pushbuttons DV1, 2, 4 and pump, for manual operation of valves DV1-2 and 4 and the LNG fluid pump, described in more detail below (see schematic in FIG. 2). The manual override array can be separately housed outside the housing 3 and the leads therefore passed through and protected by a suitable conduit. Also attached via conduit 13 to the controller box is a pump starter 14 in a NEMA-7 box 15. The skid power is typically 3-phase 230 VAC as shown by the designated arrow, and the pump power out lines are contained in conduit 16.

The input leads from the sensors (not shown) and the valve switching/control output leads are protected and contained in one or more conduit(s) 17.

The micro-controller assembly 12 includes a power supply, transformer, microprocessor, relays, instrumentation terminal strip(s), a phone modem, panic/reset button, and a cellular phone transceiver which is connected internally to external RF antenna 18. Likewise a NEMA enclosure red warning light 19 is secured to the box 3, or alternately is mounted on a suitable conduit extension in a location and height to be easily visible from all positions around the station.

The controller board 12 preferably includes an Intel KC-196 micro-controller chip 108, e.g., a 16 MHz, 16 bit processor chip with on board A/D (104), 256K SRAM connected (via separate I/F board 102) to a plurality of leak detection sensors, in this embodiment six methane detectors (0–150% Lower Flammability Limit with 30 second reset/recovery time), and a local RS232 interface port for the modem 247 and antenna 18 hookup. The bus 210, power filtering 232, referenced voltage generator 234, A/D 104, oscillator 230, buffers 241, memory 243 and page select 242 are described below in detail with reference to FIG. 6. The I/F board 102, DIO board 240, and modem are separate. The interconnect wiring is omitted for clarity. The display includes an LCD display 20 for user prompts and a schematic 21 of the tank, valve cabinet, skid, and a valving, pump and sensor layout with red/green LEDs for condition display (see FIG. 2).

FIG. 2 is an enlarged view of the display and schematic 4 visible through port 5, and includes the backlit graphic LCD display 20 and the station schematic 21 as seen by the supply driver, attendant or customer user when filling a vehicle. The schematic 21 shows the outline of 9 transportable tank container 22, preferably a 5000 gallon TVAC™ brand tank (Cryenco, Denver, Colo.) container employing high thermal performance vacuum installation system to control heat loss or gain to as low as 0.25° F. per day. Such a tank is typically a steel tank about 20' long, by 8' wide by 9' high, and operates at about 3 bar plus 1 atmosphere vacuum. It includes a manlid, a 1½" ball type airline valve, a 3" clean flow foot valve with remote controlled butterfly valve, and a 3" threaded or camlock outlet coupling with cap. The tank is generally retained in an internally buttressed steel framework with lift eyes or grapple recesses for transportability. A valve cabinet 23 houses the fittings for connection to the controller skid 2 for fill, refill and customer pumping. The pump 24 is contained on the skid 2. The TVAC tank 22 is filled or refilled via manual valve 25 (labeled DV-7 in the schematic 2) and coupling 26, while the customer user couples the vehicle to be refueled to fuel supply coupling 27 and the vapor return line to fuel vent coupling 28. The array of methane sensors are denominated L1–L6 (Leak sensors 1–6) in schematic 21, and are positioned generally as shown, L1-4 on the LNG skid 2, L5 in the TVAC valve cabinet 23 and L6 adjacent the manual vent manifold valving 29. L1 is capable of sensing leaks in the user vehicle refueling connections, L2 is located adjacent to the bottom fill/draw line 30, L3 between the recirculation line 31 and the vapor return line 32.

The leads from the sensors L1–L6 go to the microprocessor in control system 1 as described above but are omitted for clarity. The signal transmission circuit is contained within an explosion proof NEMA type junction box 38 onto which the Det-Tronics sensor element 36 is mounted. The leads are protected by conduit 37, as shown. Likewise the leads from the relays in the micro-controller go to the solenoid valves DV-1, 2 and 4 on the skid. The condition of each valve, green=open and red=closed, is displayed by the LEDs adjacent the valves. Similarly the LED below the pump, labeled DP-1, shows the pump status, green=on and red=off. A flow meter 33 measures the pumped LNG flow in line 34. DPT-1 is a pressure transducer on the pump output discharge, the signal from which goes to the microcontroller. Likewise, DT-1 measures the pump discharge temperature in line 34. The pressure of TVAC tank 22 is monitored by internal tank pressure transducer PIT-1, and the level of LNG in the tank is monitored by the sensor LG-1. The transducer signals to the microcontroller and the selected relay signals from the microcontroller pass through and are conditioned by the DIO board (FIG. 5 below). A back flow prevention check valve 35 is provided in line 32.

Table I below shows the sensors, channels assigned in the microcontroller 12, the function and the range and signal, as follows:

TABLE I

Parameters Monitored and Controlled

| Part ID | Channel | Sensor Type | Location | Function | Range | Signal |
|---|---|---|---|---|---|---|
| L-1 | 1 | Leak Detection | 2 | Fuel Line Connections | 0–150% LFL | 0–5 VDC |
| L-2 | 2 | Leak Detection | 2 | HC-1 Connections | 0–150% LFL | 0–5 VDC |
| L-3 | 3 | Leak Detection | 2 | HC-2 and HC-3 Connections | 0–150% LFL | 0–5 VDC |
| L-4 | 4 | Leak Detection | 2 | Pump and DV-7 | 0–150% LFL | 0–5 VDC |
| L-5 | 5 | Leak Detection | 23 | TVAC Valve Box | 0–150% LFL | 0–5 VDC |
| L-6 | 6 | Leak Detection | 22 | TVAC Vent | 0–150% LFL | 0–5 VDC |
| DPT-1 | 7 | Pressure | 2 | Pump Discharge | 0–250 psi | 0–5 VDC |
| DPT-2 | 8 | Pressure | 2 | Nitrogen Supply Pressure | 0–3000 psi | 0–5 VDC |
| PIT-1 | 9 | Pressure | 22 | Tank Pressure | 0–150% psi | 0–5 VDC |
| DT-1 | 10 | Temperature | 2 | Pump Discharge Temperature | 100 to –257° F. | mv |
| DFM-1 | 11 | Flowmeter | 2 | Fuel Flowmeter | 0–100 GPM | 4–20 ma |
| LLT-1 | 12 | Liquid Level | 22 | TVAC Tank Level | 0–100 in H20 | 0–5 VDC |
| DV-1A | 13 | Valve Limit Switch Open | 2 | Suction Valve Open | open/closed | 0–5 VDC |
| DV-1B | 14 | Valve Limit Switch Closed | 2 | Suction Valve Closed | open/closed | 0–5 VDC |
| DV-2A | 15 | Valve Limit Switch Open | 2 | Discharge Control Valve Open | open/closed | 0–5 VDC |
| DV-2B | 16 | Valve Limit Switch Closed | 2 | Discharge Control Valve Closed | open/closed | 0–5 VDC |
| DV-4A | 17 | Valve Limit Switch Open | 2 | Vent Valve Open | open/closed | 0–5 VDC |
| DV-4B | 18 | Valve Limit Switch Closed | 2 | Vent Valve Closed | open/closed | 0–5 VDC |
| DPC-1 | 19 | Pump Current | 15 | Pump Backpressure Build-up | 0–50 amp | 0–5 amp |
| CP-1 | 20 | Pump On/Off Command | 15 | Pump Operation | Output | 110 VAC |
| CR-1 | 21 | Card Reader | 6 | Transaction | Input | Digital |
| CV-1 | 22 | DV-1 Command | 12 | Open/Close Valve DV-1 | Output | 110 VAC |
| CV-2 | 23 | DV-2 Command | 12 | Open/Close Valve DV-2 | Output | 110 VAC |

TABLE I-continued

Parameters Monitored and Controlled

| Part ID | Channel | Sensor Type | Location | Function | Range | Signal |
|---|---|---|---|---|---|---|
| CV-4 | 24 | DV-4 Command | 12 | Open/Close Valve DV-4 | Output | 110 VAC |
| PB-1 | 25 | Panic Button Shut-Off | 15 | Emergency Shut Down | Input | 110 VAC |
| CAL-1 | 26 | Station Status Lights | 12 | Activate Red Warnings Lights | Output | 110 VAC |
| OB-1 | 27 | Operator Push Buttons | 12 | Numeric Key Pad | Inputs | Digital |
| LCD-1 | 28 | CD Display Panel | 12 | Operator Instructions | Output | Digital |

* Location 22 = TVAC; 23 - Valve Box; 2 = LNG Skid 15 = LNG Skid Power Box; 6 = LNG Skidcard; = LNG Controller

LEAK DETECTION SENSORS AND SENSOR SIGNAL TRANSMISSION CIRCUIT

The leak detectors are preferably commercially available LFL (Lower Flammability Limit) type detectors, set for 20% LFL for low alarm and 40% LFL for high alarm. Table 2 shows the % by volume in air of various gases sensed by such sensors:

TABLE II

| % by Volume in Air for 100% LFL | |
|---|---|
| $H_2$ (Hydrogen) | 4.0% |
| $CH_4$ (Methane) | 5.0% |
| $C_2H_6$ (Ethane) | 3.0% |
| $C_2H_4$ (Ethylene) | 2.7% |
| $C_3H_8$ (Propane) | 2.2% |
| $C_5H_{12}$ (Pentane) | 1.5% |

The LFL of a gas is affected by both temperature and pressure; as temperature increases, LFL decreases and hence the explosion hazard increases. Usually a pressure increase lowers LFL and LFL is relatively independent of humidity fluctuations. We prefer to use the sensor element (and its housing) from a Det-Tronics Model 226530-01 Poison Resistant (Det-Tronics, Minneapolis, Minn.) as a feed to the signal transmission circuit of this invention; the sensor element is a combustible gas sensor having a pair of elements, one an active catalytic element and the other inactive, to function as a temperature compensating reference element. Both elements are Pt wire coil encased in ceramic, but the active element has a catalytic coating the resistance of which increases as the gas concentration increases. The reference element is glazed to be nonreactive to the presence of a combustible gas/air mixture. Both elements are enclosed in a porous stainless steel cup which acts as a flame arrestor, and the two elements are separated by a thermal barrier. Both elements are on a resistance heated substrate maintained t a constant temperature of around 110° C. The sensor is disposed projecting from an explosion proof junction box that houses the sensor, signal transmission circuit board.

The novel signal transmission circuit of this invention functions as the interface between the gas sensor and field micro-controller, and provides the ability to turn the sensor on and off via the multiplexer contained within the microcontroller's signal acquisition circuitry (described below). The circuit accepts a 5 VDC power input and provides a 3 VDC source to the sensor substrate heater and to the sensor elements. The circuit has self-diagnostic capability to determine that the circuit itself is functioning properly. This is done by monitoring the heater supply voltage of 3 VDC within the circuit. Voltage drop across the sensor elements is detected within the circuit providing a measurement proportional to the resistance ratio between the active and inactive catalytic sensor elements which is used to determine flammable gas concentration. Unlike a conventional sensor transmission circuit which generates signal in the milli-amp range, the signal transmission circuit of this invention generates a 0–5 VDC output signal proportional to the level of flammable gas at the sensor. The sensors/transmitters are hardwired directly to an interface board 102 and thence to the microcontroller 12 rather than passing through a DIO board. Table I shows the dedicated channels 1–6.

The signal transmission circuit of FIG. 3 (located in junction box 38; see FIG. 1) provides the interface between the sensor and microcontroller and provides the ability to turn the sensor on and off via the multiplexer contained within the microcontroller sensor interface circuit.

The sensor signal transmission circuit 106 of FIG. 3 is shown in two parts, the heater power circuit for the sensor FIG. 3a and the sensor signal conditioning portion FIG. 3b. Both circuits are located on a single board in box 38 (see FIG. 1). Appropriately filtered 5 VDC power is input to the circuit (FIG. 3b) via pins 4 and 5 on Terminal block 40 (TB 1). The filtering of the input voltage is shown at filtering capacitor 41 (CU 1). Pins 1, 2 and 3 of TB 1, item 40 on the right of FIG. 3b, connect as designated to the same numbered heater power circuit leads (on the left of FIG. 3a): heater power 45; heater command (turn on/off) 46; and heater return (circuit operative) line 47. These are connected as shown in FIG. 3a via an OP-490AY type OP AMP, U1b, 49, and a 2N5681 transistor 50 to junction block 48, to which the sensor 36 (FIG. 1) is plugged in. Resistors, diodes and filtering capacitors are connected as shown to provide 3 VDC to the sensor heater.

The sensor 36, as described above, employs two resistors in series, one a reference and the other a catalytic oxidation element to measure the gas concentration. The sensor hi input 52 to the signal conditioning circuit (FIG. 3b) is tapped off the heater power 45, while the sensor low signal 53 on pin 4 of junction block 48 is tapped off at 53a as input to an OP-490AY type OP AMP 43, U1c, and also continues as input 53b to an OP 490AY type OP AMP 49, U1b, with the other input being the command input 46. When the amplified low return signal 53 indicates via transistor 50 that heater power is required, the command signal activates the heater power "ON" through diode D1.

The sensor mid signal 54 from the sensor 36 via pins 2 and 3 is compared and amplified in an OP-490AY type 0P amplifier 56, (U1d) and represents the difference signal across the catalytic resistor element of the sensors. The mid signal 54 is the difference across the reference resistor. The signal, and accordingly the gas concentration, is a ratio of the voltage differences of the two resistive elements in the sensor. Zero point plane (zero volt reference) is shown at 42 as the reference signal to an OP-490AY type OP AMP 43 (U1c) of the sensor low signal. The amplified output of the reference from OP AMP 43 is input to an OP-490AY type OP AMP 57 (U1a) as well as the amplified output from the catalytic element signal amplifier 56. This results in signal outputs Vo1, Vo2 and VoL (sensor low voltage output) to pins 6, 7 and 8, respectively, on the Terminal Block 40. These are the inputs to the sensor interface board (see the Appendix). This sensor transmission circuit thus produces an analog voltage signal which is proportional to the gas concentration at the particular sensor, which signal is then input directly to the interface board 102 and thence to the microcontroller 12 (described below).

Voltage drop across the sensor elements is detected within the signal transmission circuit of FIG. 3 providing a measurement proportional to the resistance ratio between the active and inactive catalytic sensor elements which is used to determine flammable gas concentration. The signal transmission circuit generates a 0–5 VDC output signal to the sensor interface circuit which is proportional to the level of flammable gas at the sensor.

The signal transmission circuit is initially factory ranged (calibrated) for 0.1 VDC output at 0% flammable gas in air to 1.1 VDC output at 5% flammable gas in air, at pins 6–8 on TB 1, (item 40). The signal transmission circuit is capable of field calibration from 0 to 8% flammable gas in air using diagnostic/calibration software provided in either a field-useable laptop, or remotely via the host computer. The signal transmission circuit permits the microcontroller to determine that the signal transmission circuit is functioning properly by monitoring the heater supply voltage of 3 VDC within the signal transmission circuit.

Factory ranging of the sensor is performed by the adjustable variable resistor identified as R8 in the signal transmission circuit schematic shown in FIG. 3. This is accomplished by exposure of the sensor element to known-concentration calibration gases prior to system assembly. Field calibration is accomplished using the diagnostic mode provided within the microcontroller firmware. The diagnostic mode may be entered via menu selection displayed on the system LCD screen 20 (FIG. 1). Only users with a valid Operators card may access the microcontroller diagnostic mode. The user enters an identification number via the system card reader 8. The microcontroller verifies the user's authorization code and level. Operator level users are then presented a menu of three options: 1) vehicle fill; 2) TVAC fill; and 3) system diagnostics. The user selects option 3 via the system keypad to bring up the diagnostic menu which contains six items, one for each sensor. The user selects a sensor number via the keypad. The next level menu provides options to: 1) turn the sensor "ON" or "OFF"; 2) display raw sensor output voltages; 3) display present zero and calibration voltage values; 4) set zero point; 5) set 25% LFL point; and 6) return. To calibrate the selected sensor, the user ensures zero concentration at the sensor head by applying a known zero calibration gas at the sensor element then selecting the "Set Zero Point" menu option. This procedure is repeated with a 25% LFL reference gas and the "Set 25% LFL Point" menu item. The user then exits with a selection of "Return" which causes the new calibration set points to be stored in serial EEPROM memory within the digital input/output circuit board assembly.

INTERFACE BOARD CIRCUIT

The sensor interface board 102 is preferably a separate board, shown in block diagram form in FIG. 4. The sensor interface board serves as the interface between the skid microcontroller and the leak detection sensor transmission circuit of FIG. 3, the common connection being to the terminal block 40 of the sensor transmission circuit. The interface board has three primary functions. These are: 1) to provide a pulse width modulated (PWM) power supply control signal 200 to the sensor heater circuits (FIG. 3a) to enable sensor temperature control; 2) multiplex the sensor's low, middle, and high output signals 201 202 and 203 (heater signal) respectively (from pins 6, 7 and 8 in FIG. 3b) to the microcontroller input analog-to-digital converter section 104 (FIG. 6); and 3) provide the sensor 36 ±5 VDC reference power 204 from a reference generator 209 (supplied with clean ±15 VDC power 249 see FIG. 6) via pins 4 and 5 of terminal block 40 (FIG. 3b). As selectively switched by microcontroller selection signal 208, the buffer and conditional amps shown provide the analog low, middle and high signals 205, 206, 207 respectively to bus 210 for distribution to the microcontroller board (FIG. 6) below.

DIGITAL INPUT/OUTPUT CIRCUIT

The digital input/output (DIO) board 240 is illustrated in the block diagram of FIG. 5 (2 pages, FIGS. 5a and 5b, respectively). The DIO board is preferably a separate board and is the primary interface between the LNG skid microcontroller circuit (FIG. 6) and all peripheral devices other than the flammable gas sensors, including but not limited to: the LCD display screen 20; keypad 9; magnetic card reader 8; RS232 serial port 11 which permits connection to a field transportable laptop computer; all process sensors, e.g., pressure DPT-1, temperature DT-1, flow meter 33, tank temperature PIT-1, tank level LL-1 and valve position, DV 1-4; and all system relays 220 for actuation of pumps 24, valves DV 1-4, purge $N_2$ pressure, and vents. The DIO board contains one 2K8 serial EEPROM memory device 227 for storage of gas leak sensor "zero" and "25% LFL" calibration voltage reference values.

As seen in FIG. 5b, the DIO board contains a buffer 221 for LCD display data which is switched by the device logic circuit 222. The device select logic circuit also switches, via digital output source drivers 223a, b and digital output sink drivers 236a, b, command outputs for all internal relays 220, display panel backlight 224 and display panel light emitting diodes L1–L6, 225. Valve limit switch inputs 238, indicative of the valve position (open/close), are received via the digital input electronics 226 (FIG. 5b), while all other analog process signals 24 and 254 are received via the signal conditioning electronics 250 and multiplexers (MUX), 251, 252 (see FIG. 5a).

The device select logic circuit 222 also switches data inputs from all process control and monitoring transducers (except the leak detection sensors), such as temperature, pressure, flow, level and position sensors. The transducer signals 254 are input from: the fuel flow meter 33 (DFM on Table I); the $N_2$ purge gas supply pressure (DPT-2 on Table I); TVAC tank liquid level LLT-1; TVAC tank pressure PIT-1; pump discharge pressure DPT-1; and the battery backup voltage. The pump temperature is measured by a type E chromel/constantan thermocouple which produces signal 256. The thermocouple reference junction is mounted to a temperature reference block monitored by an RTD (Resistance Temperature Device) which produces the resistance signal 255. The pump AC power "ON" is sensed by transducer signal 257. All three are input to conditioning electronics 250 as shown in FIG. 5a.

Referring now to FIG. 5b, the DIO board contains two universal asynchronous remote terminal(UART) devices 228, 229 with a shared oscillator 230. One UART provides the system interface to the RS485 drier 231 which is connected to the skid card reader and keypad assembly 6. The other UART 228 provides the system interface to the RS232 driver 11 which is connected to the skid external computer interface. This RS232 interface allows service personnel to connect a portable computer to the field microcontroller. The portable computer is then capable of performing all HOST system functions when running an authorized version of the HOST software. The DIO Board receives power from four distinct sources: 1) clean ±15 VDC 249 for the buffer amplifiers 251; 2) ±15 VDC supply power 245 off bus 210 which is conditioned by power conditioning circuitry 232 to produce both ±15 VDC power 233 to the card reader 8 and keypad 9, and 9 VDC power for the modem; 3) clean ±5 VDC power 250 for the board component power plane; and 4) 9 VDC power from battery backup 239 which is conditioned, stepped up and output as backup 9 V 235 to the modem and backup 15 V to the keypad and card reader.

LNG SKID MICROCONTROLLER CIRCUIT

The LNG skid microcontroller 12 performs all control, monitoring, and data management for the LNG skid control system through the execution of the microcontroller firmware. The LNG microcontroller circuit is illustrated by the block diagram in FIG. 6. The LNG microcontroller 12 interfaces to other system elements using discrete analog and digital bus 210 (denoted "Bus" in the figure) which provides signal paths connecting the LNG microcontroller with the leak detection sensor interface circuit 102 (signal path denoted "Analog Sig./8 ch."), and digital input/output circuit 240, which provides control and data signals 260. The analog leak sensor inputs are digitized by the analog-to-digital converter 104 (denoted "A/D, in FIG. 6), resident on the Intel 80C196K type 16-bit microcontroller chip 108. The LNG microcontroller uses a digital data bus with memory-to-microcontroller data buffers 241 and microcontroller-to-memory data page selector 242 to connect the microcontroller chip 108 to memory 243 for data storage (denoted "Data Logging Memory"). Digital communications are accomplished via an RS232 driver 244, for the telephone modem 247, e.g. cellular output via antenna 18 (FIG. 1), or land line 248. The microcontroller circuit contains an on-board oscillator 230 providing the system clock pulse. The microcontroller circuit accepts ±15 VDC utility power 245 from the bus, filters it in filter band 232, feeds a pair of transformers 246 to provide clean ±5 VDC power 250 to microcontroller chip 108. Both the clean filtered ±15 VDC power 249 and the ±5 VDC 250 are output to bus for other circuits of the system.

MICROCONTROLLER CONTROL OPERATIONS

FIG. 7 is a logic diagram of the firmware driven control modes of the field microprocessor control and gas leak detection system. The Intel 80C196K microcontroller contained within the LNG skid microcontroller V1.0 circuit is permanently and indelibly "burned-in" to contain the microcontroller operating software, also known as firmware in such indelible applications. The LNG skid control states of the firmware are summarized in FIG. 7. The firmware is normally held in the QUIET TIME operating mode 60 until such event as an external user or host input requires the change of skid control operating mode. In QUIET TIME mode, the microcontroller periodically and repeatedly performs all normal housekeeping, safety monitoring and host communications functions, as described below, and processes user requests which may or may require a change in skid control operating mode. When a quiet time input is received which requires a change in control mode, two possible control states may be entered. If the input requires an emergency response to shut down and make safe the LNG skid, the SAFE mode 62 is entered. The dashed arrows to SAFE show entering SAFE mode from any other mode. SAFE mode is a series of response operations to shut down the skid (close valves stop pump, report as described herein). An external action by an authorized HOST described above, is required to return to QUIET TIME operating mode once the SAFE shut-down activities mode is entered.

The second mode that may be entered by command from QUIET TIME is PUMP CHILL mode 64. The PUMP CHILL control mode performs necessary control actions to temperature precondition the LNG skid for dispense and fill operations. As shown by then dashed arrow, PUMP CHILL may exit to SAFE mode in an emergency. Normally it exits to RECIRCULATION mode 66 to maintain the skid in a ready condition for fill and dispense operations. The RECIRC mode maintains the temperature conditioning of the skid and chilling of the fuel lines by fuel recirculation for TVAC fill and customer dispense (also known as VEHICLE FILL) operations. Once the lines are properly chilled by the fuel recirculation, the control firmware enters either VEHICLE FILL 68 or TVAC FILL 70 control modes. In these modes, LNG skid control operations are performed in response to user inputs (transactions entered on the keypad 9 after the authorization via card swipe on reader 8 (See FIG. 1). Both VEHICLE FILL and TVAC FILL modes default back to QUIET MODE upon completion of the transaction. If not complete, the RECIRC mode is entered until the fill command is reentered to complete fill operation. Not complete fill, by going back to RECIRC permits termination of the fill operation at a partially full stage.

QUIET TIME mode and RECIRC modes are accessible via manual input 72 using the switch panel 7 (FIG. 1). All modes monitor for unsafe or unauthorized conditions via sensor 36 inputs to microcontroller 12, and respond by proceeding to SAFE mode when such conditions are detected.

FIG. 8 shows the operator modes preprogrammed into the field microcontroller firmware. The LNG skid control firmware is normally held in waiting in the QUIET TIME mode waiting state 61 until such event as an external user or host input requires the change of skid control operating mode. An external user initiates access to the microcontroller by inserting a magnetic or proximity card into the slot 8 of the card reader 6 (FIG. 1). The microcontroller recognizes at least two types of card, a USER card and an OPERATOR card. A card entry is read (recognized) 71 while in the WAITING state of the QUIET TIME control mode described above with reference to FIG. 7. This causes the microcontroller to attempt to validate the card 72 using authorized user number data internally stored within the LNG skid microcontroller circuit SRAM memory. The VALIDATE CARD comparison check 72 may lead to two states based on this test. If the user number is found to be authorized as valid 73 within internal memory, the firmware proceeds to the OPTIONS initializing condition 74. If the card cannot be validated internally 75 by comparison to memory, the firmware will attempt to validate by calling 76 one or more HOST sites via the internal modem. The CALL TO VALIDATE state 76 may exit to WAITING 61 if validation is unsuccessful, or to OPTIONS 74 if updated or override validation in the HOST is successful. The card reader may be bypassed 77 by an external computer connected via modem or the site RS232 port only if the GET ID state 78 successfully verifies the external computer as an authorize HOST. If not, the buyer's attempt is put on hold, as shown by Timeout 79a. If there is no selection made timely in OPTIONS state 74, the system (and user) is returned via timeout 79b to the waiting state 61.

Once in the OPTIONS state, the OPERATOR user may select via the site keypad one of three skid control states: VEHICLE FILL 68, TVAC FILL 70, and DIAGNOSTICS 80. Selecting VEHICLE FILL (described below with reference to FIG. 9 and Table III) or TVAC FILL (described below with reference to FIG. 10 and Table IV) will cause the skid controller to exit the QUIET TIME control mode and proceed through the PUMP CHILL—RECIRC—VEHICLE FILL or TVAC FILL control modes described above in reference FIG. 4. Upon completion of any TVAC FILL or VEHICLE FILL transaction, be it normal or abnormal, the controller returns to QUIET TIME control mode 61, the transaction is recorded in internal memory 81 and the firmware returns to the waiting state 85a, 85b. If the latest transaction uses the last available transaction memory site (transaction limit of the provided internal memory), or the transaction limit of a customer is reached, the firmware automatically and immediately initiates an upload to a HOST site 82, and thence returns to the waiting condition of the QUIET TIME state, 85c, 85b. The HOST can poll local memory, as well, as shown by arrow 83.

Selecting DIAGNOSTICS 80 enables a restricted operating state wherein each leak detection sensor may be individually monitored, turned "on" or "off," interrogated for current values of the two calibration points (0 and 25% LFL), or recalibrated using two new calibration points, as described above. Only selected OPERATORS are authorized to enter the DIAGNOSTICS state. Attempts by unauthorized users are unrecognized by the firmware leading to Time-out return 84 to the WAITING state 61. Sensor calibration via the diagnostic mode menu is described above with the description of the sensor transmission circuit of FIG. 3.

FIGS. 9 and 10 are flow sheets of the VEHICLE and TVAC fill operations, respectively, and may be cross-referenced to both FIG. 7 and Table III VEHICLE FILL, and Table VI TVAC FILL below.

Table III and FIG. 9 show the operator action, the controller action (sense and control response) and the LCD display prompts to the user/operator during VEHICLE FILL.

TABLE III

Normal Vehicle Fill

|  | Operator Action | Controller Action | LCD Display |
|---|---|---|---|
| 1 |  |  | "Insert Card In Card Reader To Begin Fueling" |
| 2 | Insert Card | Validate Card | "Fill Vehicle Yes or No?" |
| 3 | Push YES Button |  | "Connect Hoses and Ground Wire, Push YES" |
| 4 | Push YES Button | Verify DV-2 In Recirculation Position |  |
| 5 |  | Open DV-1 |  |
| 6 |  | Monitor DT-1 Until DT-1 is $<T_{start}$ |  |
| 7 |  | Start Pump |  |
| 8 |  | Monitor DT-1 Until DT-1 is $<T_{fill}$ |  |
| 9 |  | Display User Prompt | "Fuel Temp = ??? Push Yes To Fill or No To Abort" |
| 10 | Push YES Button | Open DV-2 To Fill Position |  |
| 11 |  | Calculate Gallons Pumped | Real-Time Gallons Pumped Displayed |
| 12 |  | Monitor Full Tank Condition | — |
| 13 |  | ?Increase In Pump Discharge Pressure? | — |
| 14 |  | Open DV-2 To Recirculate Position | Display Total Gallons Pumped |
| 15 |  | Close DV-1 | "Disconnect Hoses And Ground Wire And Enter Yes" |
| 16 | Disconnect Hoses and Ground |  |  |
| 17 | Push YES Button | Complete Transaction Record | "Don't Forget Your Card" |
| 18 |  | Signal Card Reader To Eject Card |  |
| 19 |  | Reset For Next Fill | "Insert Card In Reader To Begin Fueling" |

The VEHICLE FILL control mode shown in FIG. 9 (see also FIGS. 7 and 8) is entered when a user entering an authorized USER or OPERATOR card selects a vehicle fill transaction via the LCD display 20 (FIG. 1). As described above, vehicle fill operations require as a precondition a wait for chill 91a pump temperature condition (Pump Chill 64) and system recirculation 66 prior to dispensing the fuel 100. Free to initiate chill command 90 is made, the pump is chilled 64. When that terminates 64a as determined by the time or temperature, the initiate recirculation signal 92 is sent to the pump and valves DV1, DV2, the pump starts the recirculation 66. The operator waits for the pump chill 64.

The recirculation 66 to be completed, 91a and 91b respectively, while observing the display 20. The sensor DT1 (FIG. 1) sends a pump discharged temperature signal to the microcontroller which presents pump discharge temperature (DT-1) and estimated time to ready-for-fill condition on the LCD display 20 during PUMP CHILL 66 and RECIRC 66 control modes.

When ready, the recirculation terminates 66a, e.g., valve DV2 switches to supply 27 (FIG. 1). The microcontroller then initiates LCD menu options 93 for the desired fill operation termination condition which may be: (1) a vehicle fill to capacity; or (2) a vehicle fill of a user defined number of gallons of fuel. If the operator delays too long, the microcontroller can return the system to time out 94. The user is then prompted by the LCD panel to connect the vehicle to the skid vehicle fill lines and initiate the vehicle fill operation. This is called the "Hook up message" 95. Again, if no timely fill, the system returns to the waiting state 96. The user initiates fill 100 by connecting fill line to supply fitting 27 and vapor return to vent fitting 28 and DV4 is opened by the microcontroller. The pump then fills the vehicle from the TVAC LNG storage tank 22 via open valves 30, 34 while the LCD display monitors the fill progress 97 until either: (1) user (or safety system) action to abort further filling 98 or (2) fill completion 99. Upon completion or filling 98 or (2) fill completion 99. Upon completion or abort, the microcontroller firmware exits to the RECORD TRANSACTION states 81, or to the host 82 as discussed in the description accompanying FIG. 8.

Likewise for the storage tank fill/refill, FIG. 10 Table IV illustrate the operation:

TABLE IV

Normal TVAC Fill

| | Operator Action | Controller Action | LCD Display (Positive Response) |
|---|---|---|---|
| 1 | Insert Card | Validate Card | "Insert Card In Card Reader To Begin Fueling"<br>"Connect Hose From Truck, Ground Wire And Push YES" |
| 2 | | | "Top Fill = YES, Bottom Fill = NO" |
| 3 | Push YES or NO Button | If YES go to STEP 4, if NO go to STEP 16 | "Connect Hoses and Ground Wire Connected, Push YES" |
| 4 | Push YES Button | | "Close V-1 and open DV-7 and Push Yes" |
| 5 | Push YES Button | If YES. If NO, go to TIME OUT | |
| 6 | | Verify DV-2 In Recirculation Position | |
| 7 | | Open DV-1 | |
| 8 | | Monitor DT-1 Until DT-1 Is $<T_{start}$ | |
| 9 | | Start Pump | "Top Fill Started Push Cancel To Stop" |
| 10 | Push Cancel Button | Stop Pump | "Top Fill Stopped" |
| 11 | | Close DV-1 | "Continue Filling YES or NO?" |
| 12 | Push YES or NO Button | If YES Repeat Steps 2 and 3 and Top or Bottom Fill Procedure | |
| 13 | | If NO | "Open Valve V-1 and Push Yes" |
| 14 | Push YES Button | | "TVAC Fill Complete - YES OR NO" |
| 15 | Push YES or NO Button | If NO Go To Step 2, If YES Go To Step 22 | |
| 16 | | If No at Step 4 | |
| 17 | | Display Manual Instructions | "Open Valve V-1 on TVAC and Press YES" |
| 18 | Push YES Button | — | "Fill From Truck" |
| 19 | | | "Push CANCEL When Button Fill is Complete" |
| 21 | Push YES or NO Button | If YES Go To Step 2. IF NO, Go To Step 22 | |
| 22 | | | "Enter Gallons Filled" |
| 23 | Push Numeric Keys | | "???? Gallons Filled YES or NO?" |
| 24 | Push YES or NO Button | If No Go To Step 22, If No Go To Step 25 | |
| 25 | | | "Confirm Valves DV-7 is Closed and V-1 is Open and Enter YES |
| 26 | Push YES Button | | "Disconnect Hoses and Ground Wire, Push YES" |
| 27 | Push YES Button | Complete Transaction Record | "Don't Forget Your Card" |
| 28 | | Signal Card Reader To Eject Card | |
| 29 | | Reset For Next Fill | "Insert Card In Card Reader To Begin Fueling" |

The TVAC FILL control mode shown in FIG. 10 (see also FIGS. 7 and 8) is entered when a user entering an authorized USER or OPERATOR card requests a TVAC fill transaction via keypad selection 88 prompted by menu options presented on the LCD display 20. As described in the discussion accompanying FIG. 9, TVAC fill operations require pump temperature conditioning 64 and system recirculation 66 prior to accepting the fuel. The microcontroller presents pump discharge temperature (DT-1) and estimated time to ready-for-fill condition on the LCD display during PUMP CHILL and RECIRC control modes 91a and 91b respectively. When ready, the microcontroller initiates LCD menu options for the desired fill condition 93 which may be: (1) a TVAC fill to capacity; (2) a TVAC fill of a user defined number of gallons of fuel. The user is then prompted to connect the skid TVAC fill connections and initiate the TVAC fill operation, Hook up message 95. The fill is initiated by hook up to fitting 26 and manual valve 25 is opened by the operator (and may be prompted on the screen). Three-way valve DV-2 does not connect to fuel supply 27 and DV-4 does not open. The tank is filled through lines 34 and 31. The LCD display monitors the fill progress until either: (1) user (or safety system) action to abort further filling 98; or (2) fill completion 99. Upon completion, the microcontroller firmware exits to the RECORD TRANSACTION state 81, or to the host 82 as discussed in the description accompanying FIG. 8.

The LNG Skid Microcontroller V1.0 is equipped with RS232 serial connections to a Microcom model modem (operating at 9600 or better baud rate) which is in turn connected to a conventional cellular telephone (e.g., a Motorola model SLN4103A cellular telephone) or land line. Firmware operating states for modem activation, determination of secure connection, and modem operations are described by way of illustration in FIG. 11. Modem operation begins by firmware initiation of the RS232 UART protocol 112 which is performed on system power-up 110. The modem firmware resides in the WAIT FOR CALL (WFC) 114 state unless placed in DIAL state 116 by the firmware in response to: (1) emergency shut-down condition 118; (2) scheduled transaction data upload condition 120; or (3) transaction limit condition 122. If an incoming RING (RG) message 124 is received while in WFC state, the firmware will either: (1) establish the carrier and proceed to the CONNECT (CN) state 126; or (2) log an error message and proceed to the CLEAR MESSAGE (CM) state 128. The firmware then expects to receive a dial-back phone number which it compares to an internally stored list of valid dial-back numbers. Dial-back number lists may be periodically modified in microcontroller memory by an authorized HOST to enable remote access security. If the dial back number is verified, the firmware will hang up the modem 130 and initiate the dial back 132 to the authorized HOST. Upon connection, the microcontroller enters the RESPONSE state 134 wherein the HOST directed transactions are enabled.

In DIAL state 116, the microcontroller will proceed through the list of authorized HOST phone numbers until able to establish a valid connection. The firmware then enters the EMERGENCY RESPONSE state 118 wherein all microcontroller initiated transactions are enabled. If no valid connection is established from the internal list of authorized phone numbers, the firmware will power down the system 136 to conserve battery back-up power, wait fifteen minutes 138 and then reinitiate the DIAL state sequence.

HOST SOFTWARE:

The HOST software resides-within one or more PC-type computers located remote from the LNG skid. Example HOST sites are the skid owner's home office, the skid owner's local office, or the field technician's laptop computer. HOST software enables remote access to the LNG skid microcontroller via modem using cellular or land line telephone connections. The HOST site may perform all possible station operations by way of the microcontroller and upload and download microcontroller memory information.

Initializing the HOST software is shown in FIG. 12. The HOST software control flow routine is initiated 140 by the user's input of the LNG.EXE command at the DOS prompt within the appropriate subdirectory, normally C:/LNG which is the INSTALL program default. The software first initializes the HOST system. If unsuccessful, the software halts program execution 141 and issues an error message to the user. Otherwise, the program proceeds to display the appropriate proprietary and copyright notice screen 142. The user must respond to the screen with a carriage return, thereby initiating program execution including HOST computer user input (GUI) 143. The software then cycles between background system tasks performed in IDLE mode 144 and response to user keyboard/mouse inputs 145 as required until exit, 146 (QUIT).

Control modes of the HOST software, when assessing the LNG skid microcontroller, are defined in FIG. 13. From IDLE mode 60 (also called QUIET TIME), the host system operator may initiate a connection to the LNG skid microcontroller by point-and-click action with the computer's mouse. Upon connection, the HOST downloads a user request for call-back and enters the CALL-BACK WAIT mode 150. Upon call-back connection, the HOST may proceed to either: (1) MONITOR mode 151 wherein all LNG skid control and monitoring transactions are enabled; or (2) MANUAL UPLOAD mode 152 wherein all skid microcontroller memory read/write transactions are enabled. The skid microcontroller may initiate the AUTO UPLOAD mode 153 via call-in to the HOST which may on a preset timed routine (timer 154 in FIG. 13). The HOST may also revisit and analyze previously uploaded data stored in HOST memory via the REPLAY mode 155. REPLAY mode features simulated real-time playback of stored data for system diagnostic, training, or analysis purposes. All HOST operating modes are interrupted by an emergency call-in from any field skid unit. This interrupt places the HOST into EMERGENCY mode 156. EMERGENCY mode posts an operator alert (including an audible beep), performs a log entry, and immediately uploads and stores all memory resident data from the calling skid microcontroller. EMERGENCY mode terminates automatically when the data exchange is completed 157.

Figure 14:
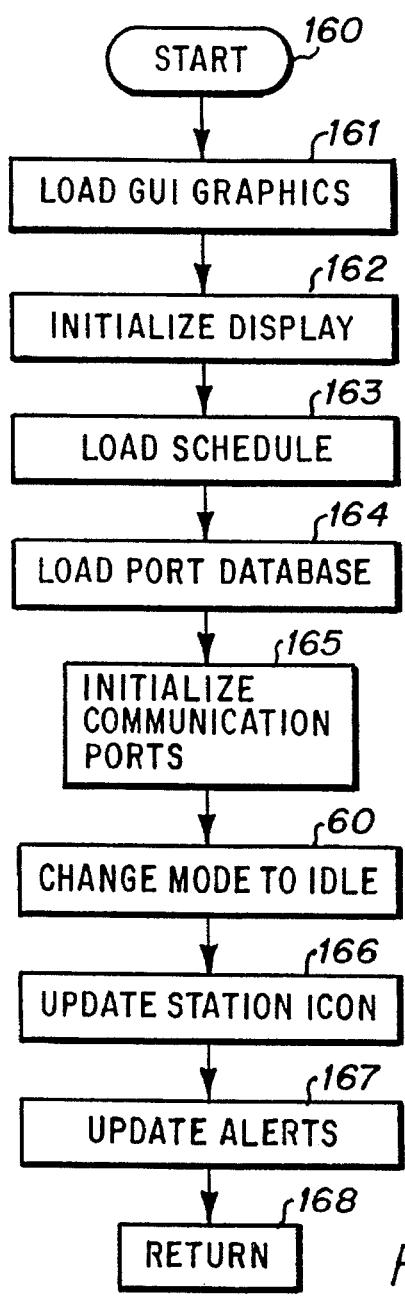
FIG. 14 is a flow sheet of the host computer system software routine for initializing the system control flow.

As noted above with respect to FIG. 12, the HOST software is initiated by the user's input of the LNG.EXE command at the DOS prompt within the appropriate subdirectory, normally C:\LNG which is the INSTALL program default. The software first initializes the HOST system by performing the tasks diagrammed in FIG. 14. The primary functions of the initialization routines are to set the HOST system operating parameters and load the pertinent database information from HOST storage. After start of routine 160 and loading the HOST computer user input 161 (Get User Input) the screen displays are initialized 162, which includes presentation of the copyright, patent, trademark and proprietary notices, the system will: (1) load the schedule database 163 describing the HOST auto upload schedule for the remote station microcontrollers; (2) load the database of port configurations 164 and initialize the communications ports 165; (3) proceed to the IDLE control mode 60 and update the station icon tables and screen 166; and (4) update the alert tables and notify of unanswered or open alert conditions 167. The software then returns 168 to its normal priority driven progression through the SYSTEM TASKS (See FIG. 13), unless interrupted by user input or station call-in.

The HOST system tasks control flow routine is diagrammed in FIG. 15. This diagram illustrates the normal operating functions of the HOST software. Upon startup of the routine 170, each task cycle begins with an update to the system clock 171. The software then checks the status of each enabled interconnection port for input of any call-in message or disconnect message 172. If the software detects a disconnect message, a timer is initiated for the anticipated call-back 173 from the remote station. If the software has registered a disconnect during a previous cycle, the timer is updated. If a 'time-out' condition is reached in the current cycle, the software logs a user alert message 174 to the screen and to memory then returns to normal processing flow 60 (FIG. 13). In the event that no call-in or disconnects are received, the system continues with normal processing flow 175. The software next proceeds to a priority driven scheduler wherein each current system task is listed 176 and prioritized 177 in a task queue. The single highest priority task 178 is executed within the current software cycle. Remaining tasks are retained in the task queue for completion during subsequent cycles. The software next evaluates its internal auto upload schedule tables 179 to determine the need to initiate an upload cycle. If a positive response is obtained, the auto upload routines 153 (See FIG. 13) are initiated. Finally, the software evaluates the control mode state to determine if the system is performing in REPLAY 155 (Se FIG. 13) rather than real-time mode. If operations are occurring in REPLAY mode, the software extracts the next log file input data set 180 prior to concluding the routine by returning to the beginning of the system control software cycle.

The software control flow for evaluating and reacting to HOST system data port interfaces to the remote skid locations is illustrated in FIG. 16. Upon starting the routine 187, the software evaluates the port status 181 for each remote skid location (called a channel in the figure) during each system control cycle to determine: (1) whether the channel is active 182; and (2) whether the channel connection is valid and functioning properly 183. The software then responds to the call-in by establishing the data connection 184a, or alternately attempts to reestablish the connection should an existing connection fail 185a. This includes evaluating changes in field micro controller identification 186, and handling lost connections 185b and call-ins 184b.

Figure 17:
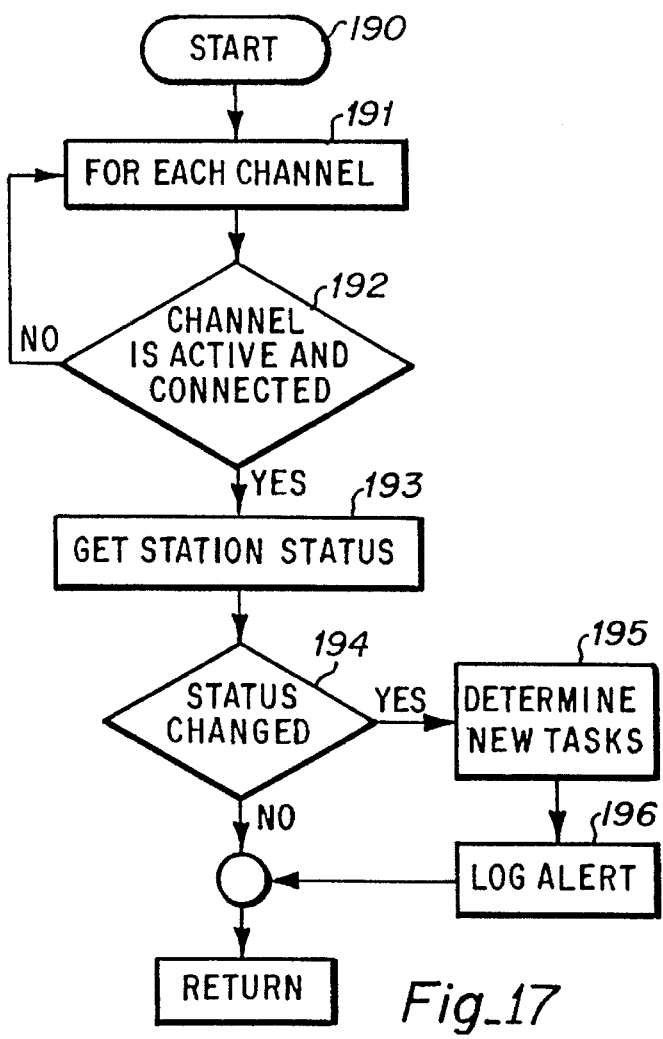
FIG. 17 is a flow sheet of the host computer control of task reevaluation.

The software control flow for reevaluating and prioritizing the HOST system tasks for each remote skid location is illustrated in FIG. 17. Upon routine startup 190 the software evaluates the current task list for each remote skid location 191 (called a channel in the figure) during each system control cycle to determine: (1) whether the channel is active 192; and (2) whether the channel (field station) status (state or mode in which the station is at polling time) 193 has changed from the previous system control cycle. The software then responds to any status change 194 (See FIG. 13) by reevaluating the task priority list 195 and logging alerts 196, when necessary.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A cryogenic LNG fuel field station control system for automated control of a typically above-ground LNG fuel storage and dispensing station, which LNG storage and dispensing station includes a portable pump and piping skid assembly for conditioning lines, pumps and valves for cryogenic LNG fuel storage and delivery, and through which both supply tanker and customer user vehicles can be connected to a cryogenic LNG fuel storage tank via a valve manifold for selective refilling of said cryogenic LNG storage tank and for refueling of said user vehicles from said cryogenic LNG storage tank; said cryogenic LNG field station control system comprising:

(a) at least one LNG leak detection sensor sensitive to hydrocarbon fuel vapors mounted in association with said LNG storage and dispensing station;

(b) a means for authorization of customer vehicle fueling and supply tanker refueling use of said LNG storage and dispensing station;

(c) means for communicating with a remote host computer, the remote host computer having means for remote control of said LNG storage and dispensing station; and (d) a micro controller mounted in association with said station including means for:
   i) recognizing authorized users and activating fueling or refueling use of said station upon said recognition;
   ii) monitoring system conditioning;
   iii) initiating shutting down of said station in response to detection by said sensor of an LNG fuel leak; and
   iv) commencing emergency actions upon the occurrence of predetermined emergency conditions, said emergency actions including initiating shut-downs, and transferring records selected from transactions and inventory status to said host computer.

2. Method of operation of a field cryogenic LNG fuel storage and dispensing station comprising the steps of:

(a) maintaining said station in a waiting state monitorable via remote communications link;

(b) reading user identification information on site and comparing said information to an authorized user list which includes at least one authorized fueling customer and at least one resupply vendor;

(c) initializing fueling or refueling operation of said station upon verification of authorization of said user and in accord with the type of user;

(d) monitoring said station operations for pump, valve and LNG leaks;

(e) recording user transactions including vehicle fill quantities and user identification;

(f) communicating selected information regarding said station selected from one or more of station condition, operation, monitoring, user transactions, leak detection and inventory to a remote host; and (g) shutting down said station in the event of predetermined emergency conditions including LNG leaks in excess of a preset limit.

3. An automated LNG field station control system as in claim 1, wherein:

(a) said authorization means is associated with the LNG storage and dispensing station such that liquid natural gas is dispensed from the storage and dispensing station only when a customer authorization means permits; and which system includes:

(b) a fuel shut off means for shutting off the flow of liquid natural gas from the storage and dispensing station.

4. An automated LNG field station control system as in claim 3, wherein:

(a) the fuel shut off means is controlled by the authorization means to shut off the flow of LNG from the storage and dispensing station except when the authorization means is turned on.

5. An automated LNG field station control system as in claim 3, wherein:

(a) said authorization means is a card reader;

(b) said microcontroller includes control of fuel shut off according to input from the authorization means; and (c) said fuel shut off means is also controlled by the leak detection sensor such that when a fuel leak is detected by the leak detection sensor then the fuel shut off means shuts down pumping LNG from the storage and dispensing station.

6. An automated LNG field station control system as in claim 3, wherein:

(a) said microcontroller alerts said host computer to said emergency condition.

7. An automated LNG field station control system as in claim 3, wherein:

(a) said microcontroller permits monitoring of one or more of the field station conditions, the tank fuel inventory status, leak detection and user transactions.

8. An automated LNG field station control system as is claim 1 which includes:

(a) a plurality of on-site attendant-less field stations; and (b) a host computer including means for monitoring one or more of the field station conditions, the tank fuel inventory status, leak detection and user transactions.

9. An automated LNG field station control system as in claim 1 wherein:

(a) said microcontroller permits attendant-less customer fueling from, and supplier refueling of, said station LNG storage tank.

10. An automated LNG field station control system as in claim 1 wherein:

(a) said microcontroller authorized user recognizing means includes means for recognizing fueling suppliers to permit refueling said LNG storage tank.

11. An automated LNG field station control system as in claim 9 wherein:

(a) said microcontroller fueling supplier means includes means for recognizing a fuel supplier vendor and permitting access to a storage tank fill means associated with said valve manifold.

12. An automated LNG field station control system as in claim 10 wherein:

(a) said microcontroller alerts said host computer to said emergency condition.

13. An automated LNG field station control system as in claim 12 wherein:

(a) said microcontroller permits monitoring of one or more of the field station conditions, the tank fuel inventory status, leak detection and user transactions.

14. A method of operation of a field LNG station as in claim 2 which includes the step of:

(a) selecting said users from fueling customers and fuel resupply vendors in accord with said verified user authorization.

15. A method of operation of a field LNG station as in claim 2 which includes the step of:

(a) monitoring said station by a remote host computer, and said monitoring is of one or more of the field station conditions, tank fuel status, leak detection and user transactions.

16. A method of operation of a field LNG station as in claim 15 wherein:

(a) said host computer monitoring step includes iteration to monitor a plurality of said field LNG stations.

17. A method of operation of a cryogenic field LNG fuel storage and dispensing station, the method comprising the steps of:

(a) reading user identification information at the storage and dispensing station;

(b) comparing the user identification information to an authorized user list;

(c) initializing appropriate user operation of the storage and dispensing station when the user identification information matches a listing in the authorized user list;

(d) monitoring the storage and dispensing station for the occurrence of emergency conditions, including hydrocarbon fuel vapor leak detection;

(e) shutting down operation of the storage and dispensing station upon the detection of an occurrence of at least one preselected emergency condition; and (f) steps (a) through (e) are attendantless operations performed under the control of a microprocessor.

18. The method of claim 17, wherein:

(a) the emergency conditions include detection of an LNG leak in excess of a preset limit.

19. The method of claim 17, which includes the added step of:

(a) detecting an LNG hydrocarbon fuel leak by a leak detector and transmitting an indication of the LNG fuel leak from said detector to the microprocessor.

20. The method of claim 17, which includes the step of:

(a) causing the microprocessor to communicate with a host computer, the host computer being located distant from the field liquid natural gas storage and dispensing station.

21. The method of claim 20, wherein:

(a) transferring records to the host computer when the microprocessor shuts down operation of the storage and dispensing station.

22. The method of claim 21, wherein:

(a) the records include transaction records.

23. The method of claim 20 which includes the steps of:

(a) monitoring said field station by said remote host computer, said monitoring being selected from one or more of field station condition, tank fuel status, leak detection, and user transactions.

24. The method of claim 23 wherein:

(a) said host computer monitoring includes a plurality of field LNG fuel stations.

* * * * *